United States Patent
Kuriyagawa et al.

(10) Patent No.: US 10,070,580 B2
(45) Date of Patent: Sep. 11, 2018

(54) LAWN MOWER

(71) Applicant: HONDA MOTOR CO., LTD., Tokyo (JP)

(72) Inventors: Koji Kuriyagawa, Wako (JP); Hajime Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 15/443,478

(22) Filed: Feb. 27, 2017

(65) Prior Publication Data

US 2017/0245428 A1 Aug. 31, 2017

(30) Foreign Application Priority Data

Feb. 29, 2016 (JP) ................. 2016-037209

(51) Int. Cl.
  *A01D 34/63* (2006.01)
  *A01D 34/73* (2006.01)
  (Continued)

(52) U.S. Cl.
  CPC ....... *A01D 34/006* (2013.01); *A01D 34/6806* (2013.01); *A01D 34/73* (2013.01);
  (Continued)

(58) Field of Classification Search
  CPC ........ A01D 34/00; A01D 34/68; A01D 34/73; A01D 34/76; A01D 34/001; A01D 34/008; A01D 34/63; A01D 34/82; A01D 34/006; A01D 34/005; A01D 34/6806; A01D 43/0631; A01D 2101/00; A01D 34/6812
  (Continued)

(56) References Cited

U.S. PATENT DOCUMENTS 3,385,043 A * 5/1968 Seymore ............... A01D 34/005
  56/503
3,389,541 A * 6/1968 Freedlander ........... A01D 34/73
  56/295

(Continued)

FOREIGN PATENT DOCUMENTS

JP   2002-315416 A   10/2002
JP   2002-315418 A   10/2002
JP      3771529 B2    4/2006

OTHER PUBLICATIONS

Related co-pending U.S. Appl. No. 15/442,971.
(Continued)

*Primary Examiner* — John Weiss
(74) *Attorney, Agent, or Firm* — Westerman, Hattori, Daniels & Adrian, LLP

(57) ABSTRACT

A lawn mower includes a drive source for driving a cutter blade through a rotation shaft, a flap provided for the cutter blade in a manner that the flaps have a flap angle changeable along a horizontal line which is perpendicular to the rotation shaft, an actuator for controlling the flap angle of the flaps, a control unit for controlling the actuator, and a blade switching unit for switching the cutter blade between an operation state and a stop state. When the control unit determines that a stop switch signal has been received from the blade switching unit, the control unit controls the actuator to increase the flap angle of the flaps.

4 Claims, 17 Drawing Sheets

(51) Int. Cl.
*A01D 34/76* (2006.01)
*A01D 34/00* (2006.01)
*A01D 34/68* (2006.01)
*A01D 43/063* (2006.01)
*A01D 101/00* (2006.01)

(52) U.S. Cl.
CPC ............ *A01D 34/76* (2013.01); *A01D 43/063* (2013.01); *A01D 2101/00* (2013.01)

(58) Field of Classification Search
USPC ................. 56/10.2 R, 10.4, 196, 289, 295
See application file for complete search history.

(56) References Cited

U.S. PATENT DOCUMENTS

| | | | | |
|---|---|---|---|---|
| 3,724,182 A | * | 4/1973 | Long | ...................... A01D 42/00 37/243 |
| 5,040,364 A | * | 8/1991 | Deegan | .............. A01D 43/0631 56/320.2 |
| 5,377,774 A | * | 1/1995 | Lohr | .................... B62D 51/004 180/19.1 |
| 2002/0152736 A1 | | 10/2002 | Hasei et al. | |
| 2002/0153179 A1 | | 10/2002 | Kobayashi et al. | |
| 2003/0182916 A1 | | 10/2003 | Iida et al. | |
| 2004/0187463 A1 | * | 9/2004 | Eddy | ....................... A01D 34/73 56/295 |
| 2005/0066643 A1 | * | 3/2005 | Fukushima | .......... A01D 34/006 56/16.7 |
| 2012/0000173 A1 | * | 1/2012 | Papke | .................... A01D 34/82 56/14.7 |

OTHER PUBLICATIONS

Related co-pending U.S. Appl. No. 15/442,899.
Related co-pending U.S. Appl. No. 15/443,213.
Related co-pending U.S. Appl. No. 15/443,257.
Related co-pending U.S. Appl. No. 15/443,144.

* cited by examiner

LAWN MOWER

CROSS-REFERENCE TO RELATED APPLICATION

This application is based upon and claims the benefit of priority from Japanese Patent Application No. 2016-037209 filed on Feb. 29, 2016, the contents of which are incorporated herein by reference.

BACKGROUND OF THE INVENTION

Field of the Invention

The present invention relates to a technique of a rotary lawn mower for cutting lawn grass by a cutter blade accommodated in a housing.

Description of the Related Art

The rotary lawn mower cuts (clips) lawn grass by rotating a cutter blade accommodated in a housing having an opened bottom, along lawn grass to cut the lawn grass. As a technique of such a lawn mower, for example, Japanese Laid-Open Patent Publication No. 2002-315418 is known.

The lawn mower known in Japanese Laid-Open Patent Publication No. 2002-315418 includes a housing having an opened bottom, a rotation shaft positioned inside the housing and extending in a vertical direction of the housing, and a narrow and long cutter blade accommodated in the housing in a manner that the cutter blade is rotatable about the rotation shaft. This cutter blade has blades and air lifts at both ends in a longitudinal direction. The blades are formed at front edges in a rotation direction of the cutter blade, and the air lifts are curved to extend backward, and upward from the rear positions of the blades. When the cutter blades are rotated, the air lifts generate an upward air flow and a swirl air flow. By orienting the lawn grass growing on the lawn ground to stand upright by the upward air flow, it is possible to cut (clip) the lawn grass by the cutter blade efficiently. The lawn grass (grass clippings) cut by the cutter blade is lifted upward, and swirled in the housing by the upward air flow and the swirl air flow generated by the air lifts, and then, transported into a grass clippings container.

SUMMARY OF THE INVENTION

By increasing the rotation speed of the cutter blade, it is possible to improve the lawn mowing performance and the transportation performance to the grass clippings container. However, noises are generated by the lawn mower during rotation of the cutter blade. As the rotation speed of the cutter blade gets higher, the noises tend to get louder. Therefore, there is a demand to generate swirl wind efficiently in accordance with the working condition of the lawn mowing operation.

Further, in terms of improving the work efficiency of the lawn mower, it is preferable to stop the cutter blade promptly at the time of switching operation of the cutter blade from the rotation state to the stop state.

An object of the present invention is to provide a technique which makes it possible to efficiently generate swirl wind in accordance with the working condition of lawn mowing operation, and promptly stop a cutter blade at the time of switching operation of the cutter blade from a rotation state to a stop state.

In the present invention, a lawn mower includes a cutter blade rotatable about a rotation shaft extending in a vertical direction, and a drive source configured to drive the cutter blade through the rotation shaft. Further, the lawn mower includes a flap provided for the cutter blade in a manner that the flap has a flap angle changeable along a horizontal line which is perpendicular (or substantially perpendicular) to the rotation shaft, an actuator configured to control the flap angle of the flap, and a control unit configured to control the actuator.

Therefore, it is possible to set the flap angle of the flap provided for the cutter blade by the actuator as necessary, to an optimum angle in accordance with the working condition of the lawn mower. Accordingly, it is possible to efficiently generate swirl wind by the flap in accordance with the working condition of the lawn mower. It is possible to efficiently swirl the lawn grass (grass clippings) cut by the cutter blade in the housing by the swirl wind, and transport the lawn grass into the lawn grass clippings container efficiently. Accordingly, it is possible to improve the energy consumption efficiency, of the drive source (power source) for driving the cutter blade. Further, it is not required to change the rotation speed of the cutter blade.

Further, the lawn mower includes a blade switching unit configured to switch the cutter blade between an operation state and a stop state. The control unit is configured to control the actuator to increase the flap angle of the flap in a case in which the control unit determines that a stop switch signal has been received from the blade switching unit. Therefore, when the cutter blade is switched from the rotation state to the stop state, the flap angle of the flap is increased. That is, the flap is oriented upright. The air resistance of the flap which rotates together with the cutter blade is increased. Therefore, it is possible to stop the cutter blade promptly. Thus, the operator can smoothly go on to the next operation. Accordingly, it is possible to improve the work efficiency of the lawn mower.

Preferably, the lawn mower further includes a stop detection unit configured to detect that at least one of the drive source and the cutter blade in a rotation state has been stopped, and output a stop signal, and the control unit is configured to control the actuator to place the flap angle of the flap in a substantially horizontal state in a case in which the control unit determines that the stop signal has been received from the stop detection unit.

Therefore, when the rotating drive source or the rotating cutter blade is stopped, the flap is placed in the horizontal state. Even in the case of rotating the cutter blade at the time of restarting operation of the drive source or the case of restarting operation of the cutter blade during rotation of the drive source, it is possible to reduce the air resistance by the flap as much as possible. Accordingly, it is possible to improve the efficiency in starting operation of the drive source. Consequently, it is possible to improve the work efficiency of the lawn mower.

Preferably, the lawn mower further includes a drive source operation switch configured to switch between start and stop of operation of the drive source, and a flap angle detection unit configured to detect the flap angle of the flap. The control unit is configured to control the actuator to place the flap in a horizontal state upon reception of a start operation signal from the drive source operation switch, and thereafter, start operation of the drive source after receiving a signal indicating that the flap is at an angle of the horizontal state, from the flap angle detection unit.

Therefore, when the drive source operation switch is operated to start operation, after the flap is placed in the horizontal state, it is possible to start operation of the drive source. If the flap is in the horizontal state, it is possible to start operation of the drive source directly. Therefore, even in the case of rotating the cutter blade at the time of restarting operation of the drive source, it is possible to reduce the air resistance by the flap as much as possible. Accordingly, it is possible to improve the efficiency in starting operation of the drive source. Consequently, it is possible to improve the work efficiency of the lawn mower.

Preferably, the lawn mower further includes a clutch provided in a working power transmission system from the drive source to the rotation shaft, and a flap angle detection unit configured to detect the flap angle of the flap. The blade switching unit is configured to switch the clutch to switch the cutter blade between the operation state and the stop state, and configured to output an operation switch signal when the cutter blade has been switched to the operation state. The control unit is configured to control the actuator to place the flap in the substantially horizontal state upon reception of the operation switch signal from the blade switching unit, and thereafter, start rotation of the cutter blade after receiving a signal indicating that the flap is at an angle of the horizontal state, from the flap angle detection unit.

Therefore, when the blade switching unit is switched to the operation state, after the flap is placed in the horizontal state, it is possible to start rotation of the cutter blade. If the flap is in the horizontal state, it is possible to start rotation of the cutter blade directly. Therefore, at the time of rotating the cutter blade, it is possible to reduce the air resistance by the flap as much as possible. Accordingly, it is possible to improve the efficiency of starting operation of the cutter blade. Consequently, it is possible to improve the work efficiency of the lawn mower.

In the present invention, the lawn mower can generate the swirl wind efficiently in accordance with the working condition of the lawn mowing operation. Further, when operation of the cutter blade is switched from the rotation state to the stop state, it is possible to promptly stop the cutter blade.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment for carrying out the present invention will be described with reference to the accompanying drawings.

A lawn mower according to the embodiment will be described with reference to the drawings. It should be noted that, in the following description, the words "front", "rear", "left", "right", "upper", and "lower" are used to refer to directions as viewed from a human operator. "Fr" denotes the front side, "Rr" denotes the rear side", "Le" denotes the left side, "Ri" denotes the right side, and the "CL denotes" the center of the machine width (central line of the machine width).

Figure 1:
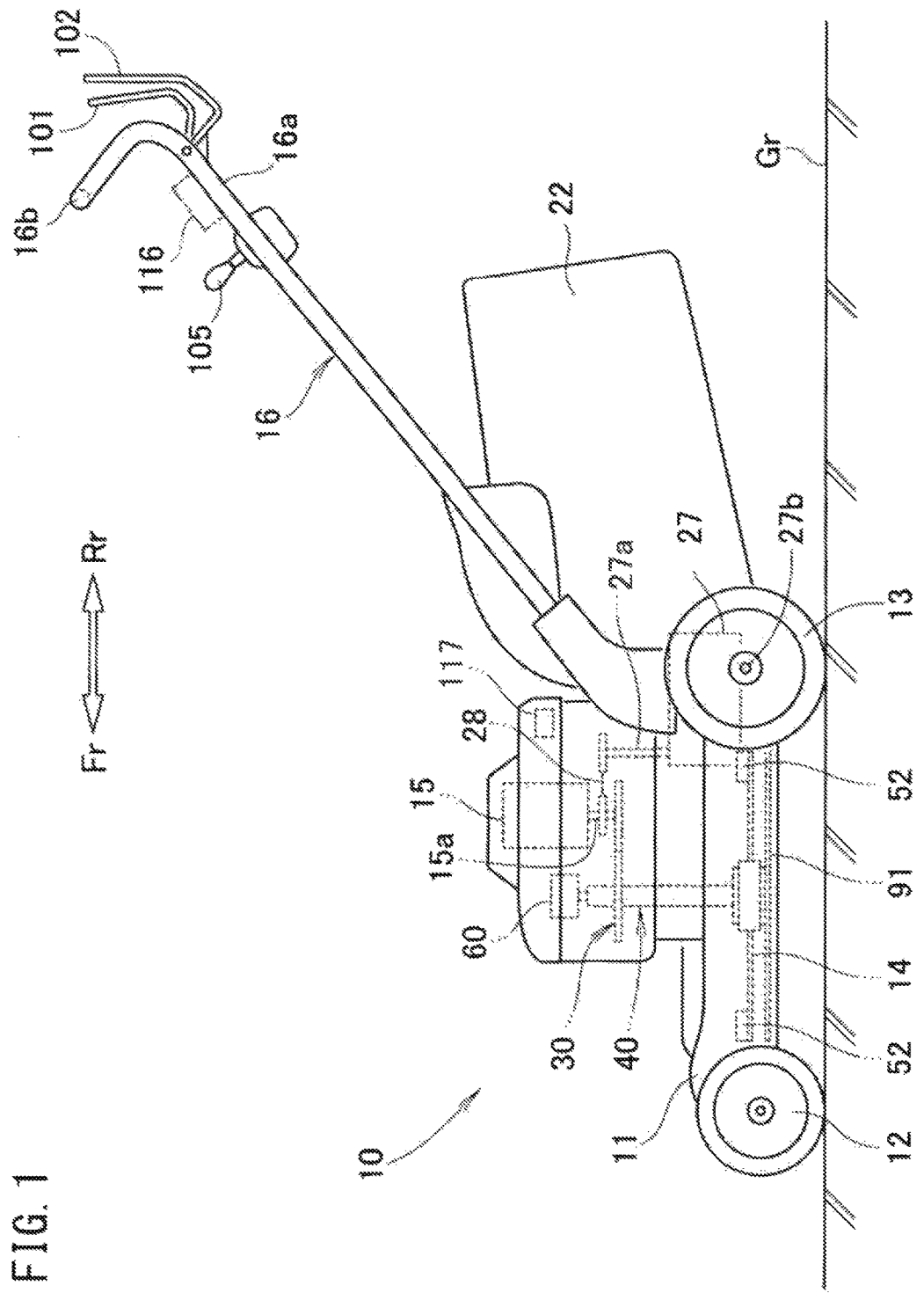
FIG. 1 is a left side view of a lawn mower of the present invention.
Figure 2:
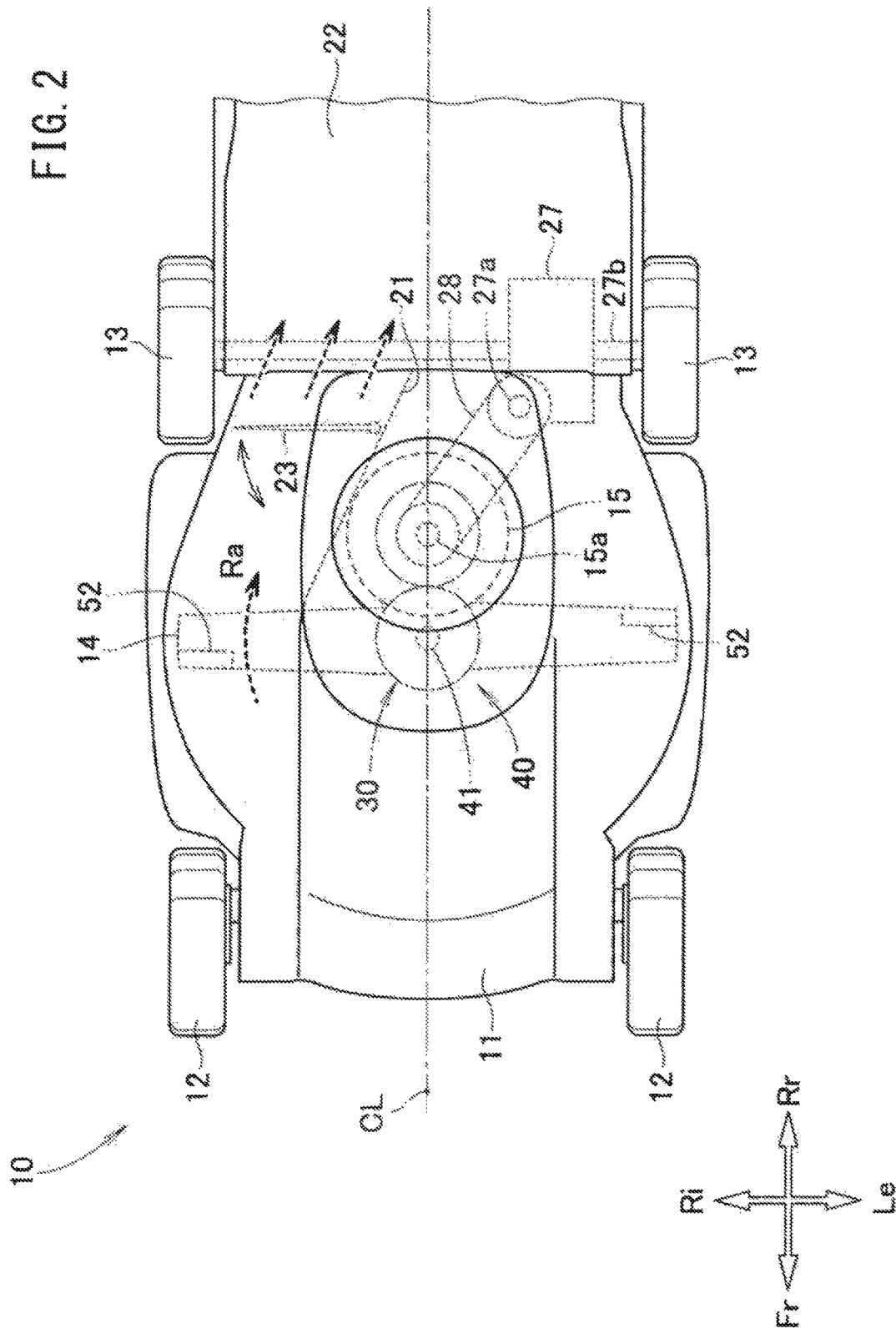
FIG. 2 is a plan view of the lawn mower shown in FIG. 1.

As shown in FIGS. 1 and 2, a lawn mower 10 is a walk-behind, self-propelled working machine for cutting lawn grass. The lawn mower 10 includes a housing 11, left and right wheels 12 provided on the front side of the housing 11, left and right wheels 13 provided on the back side of the housing 11, a cutter blade 14 accommodated inside the center of the housing 11 for cutting lawn grass, a drive source 15 (engine 15) provided above the housing 11, and an operation handle 16 extending backward from the housing 11. In the following description, a case where the drive source 15 is an engine is taken as an example. It should be noted that the drive source 15 is not limited to the engine. For example, the drive source 15 may be an electric motor.

As shown in FIG. 2, in a plan view, this lawn mower 10 rotates the cutter blade 14 clockwise by the engine 15 to cut (clip) the lawn grass, and generates flows of the air (swirl air flow or swirl wind) in the housing 11 as indicated by an arrow Ra. By the swirl air flow, the lawn grass cut by the cutter blade 14 can be delivered to, and stored in a grass clippings container 22 through a grass clippings discharge passage 21. For example, the grass clippings container 22 is a bag. Hereinafter, the lawn grass cut (clipped) by the cutter blade 14 will be referred to as the "grass clippings".

As shown in FIG. 1, this housing 11 is a so-called opened bottom housing where only the lower end surface (surface facing the lawn ground Gr) of the housing 11 is opened entirely. This housing 11 is a member having a spiral shape in a plan view, i.e., a spiral case (scroll case). The housing 11 has a scroll section for swirling the lawn grass cut by the cutter blade 14 by the swirl wind, and transporting the lawn grass (grass clippings) toward the grass clippings discharge passage 21. Structure of this housing 11 is well known (see Japanese Patent No. 3771529).

As shown in FIG. 2, a mode switch damper 23 is provided for the grass clippings discharge passage 21. This mode switch damper 23 can be operated by a damper operation lever 24 (see FIG. 8). This damper operation lever 24 is a mode switching unit for switching the mode switch damper 23. Hereinafter, this damper operation lever 24 will also be referred to as the "mode switching unit 24" as necessary. By operating the damper operation lever 24, it is possible to switch the operating mode as necessary, between (1) a bagging mode for opening the mode switch damper 23 to store the grass clippings in the grass clippings container 22 and (2) a mulching mode for closing the mode switch damper 23 to discharge the grass clippings to a position below the housing 11.

Figure 3:
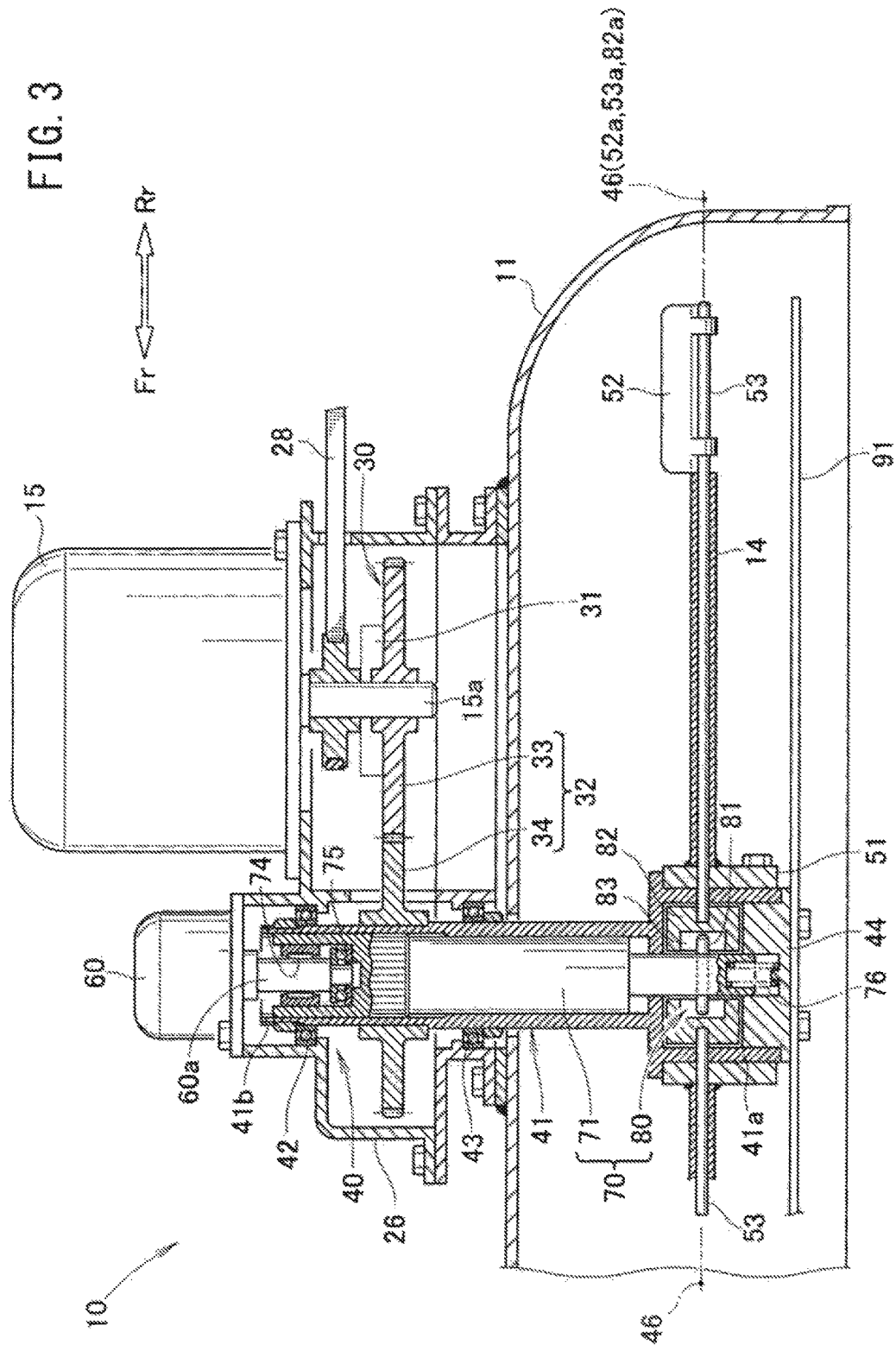
FIG. 3 is a cross sectional view showing a drive source, a cutter mechanism, and an area around a cutter blade shown in FIG. 1.

As shown in FIG. 3, this housing 11 also serves as a machine body, and includes a stand 26 at an upper position. The engine 15 is mounted on an upper end surface of this stand 26. The engine 15 has an output shaft 15a extending from its lower end toward the lawn ground Gr (ground Gr) into the housing 11. The output shaft 15a is a rotation shaft positioned above the housing 11, and extends in a vertical direction (in an up-down direction) of the housing 11. Consequently, the output shaft (rotation shaft) 15a is substantially perpendicular to the horizontal lawn ground Gr.

As shown in FIGS. 1 and 3, the left and right rear wheels 13 are travel drive wheels. That is, the power generated by the engine 15 is transmitted to the left and right rear wheels 13 through a transmission 27 (hydraulic continuously variable transmission 27). An input shaft 27a of the hydraulic continuously variable transmission 27 is coupled to the output shaft 15a of the engine 15 by a belt 28. This hydraulic continuously variable transmission 27 can switch (reverse) the rotation direction of an output shaft 27b (wheel shaft 27b) outputted to the rear wheels 13, in response to the rotation direction of the input shaft 27a driven by the engine 15, and switch (change the transmission) of the rotation speed of the output shaft 27b continuously, in response to the rotation speed of the input shaft 27a. The structure of this hydraulic continuously variable transmission 27 is well known (e.g., see Japanese Laid-Open Patent Publication No. 2002-315416).

As shown in FIG. 3, the power generated by the engine 15 is transmitted to a cutter mechanism 40 by a working power transmission system 30. A clutch 31 and a power transmission mechanism 32 are provided in the working power transmission system 30 from the engine 15 to a rotation shaft 41 of the cutter mechanism 40. The power transmission mechanism 32 is made up of a drive gear 33 and a driven gear 34. The drive gear 33 is attached to the output shaft 15a of the engine 15 through the clutch 31. The driven gear 34 is attached to an upper end 41b of the rotation shaft 41. These gears 33, 34 are spur gears. When the clutch 31 is in the OFF state, the rotation shaft 41 is released from the output shaft 15a of the engine 15. When the clutch 31 is in the ON state, the rotation shaft 41 is coupled to the output shaft 15a of the engine 15.

It should be noted that the power transmission mechanism 32 is not limited to a gear mechanism. The power transmission mechanism 32 may be a belt type power transmission mechanism made up of a drive pulley, a driven pulley, and a belt. The drive pulley is attached to the output shaft 15a of the engine 15. The driven pulley is attached to the rotation shaft 41. The belt is hooked between the drive pulley and the driven pulley.

In the case where the power transmission mechanism 32 is the belt type power transmission mechanism, a belt tensioner may be used as the clutch 31. This belt tensioner is operated in accordance with switching operation of a blade switching unit 104 (see FIG. 8) described later. The belt tensioner actuates the belt to turn on the clutch, and de-actuates the belt to turn off the clutch. The above belt tensioner type clutch is known.

Hereinafter, this cutter mechanism 40 and the cutter blade 14 will be described in detail.

Figure 4:
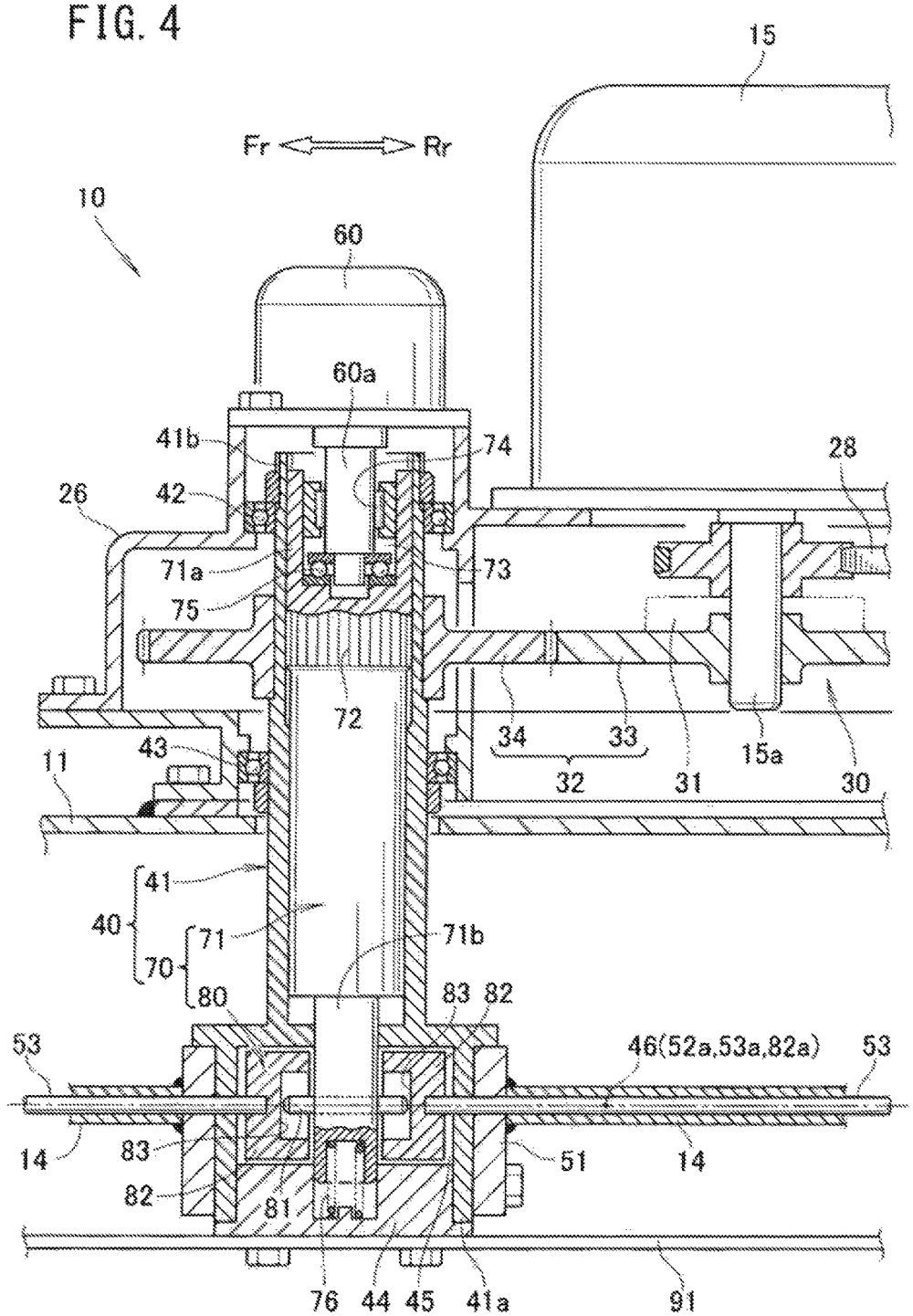
FIG. 4 is a cross sectional view in which the cutter mechanism and the area around the cutter blade shown in FIG. 3 are enlarged.

As shown in FIG. 4, the cutter mechanism 40 includes the rotation shaft 41 and a transmission mechanism 70. This transmission mechanism 70 will be described later. The rotation shaft 41 extends in a vertical direction of the housing 11. The rotation shaft 41 is positioned in parallel to the output shaft 15a of the engine 15. This rotation shaft 41 is supported by bearings 42, 43 in a manner that the rotation shaft 41 is rotatable but restricted axially with respect to the stand 26. Consequently, the rotation shaft 41 is supported in a manner that the rotation shaft 41 is rotatable with respect to the housing 11, and movement of the rotation shaft 41 in the axial direction is restricted.

The rotation shaft 41 is a hollow shaft. Hereinafter, this rotation shaft 41 will also be referred to as the "hollow shaft 41" as necessary. A lower end 41a of the rotation shaft 41 is positioned within the housing 11. The diameter of this lower end 41a of the rotation shaft 41 is larger than the other portion of the rotation shaft 41. The lower end 41a is opened downward to have a substantially cup shape. The opened end surface in the lower end 41a is closed by a cap 44. The cap 44 is detachably attached to the lower end 41a of the rotation shaft 41 by a fixing member such as a bolt. The inside of the lower end 41a and the cap 44 form a space 45.

Figure 5:
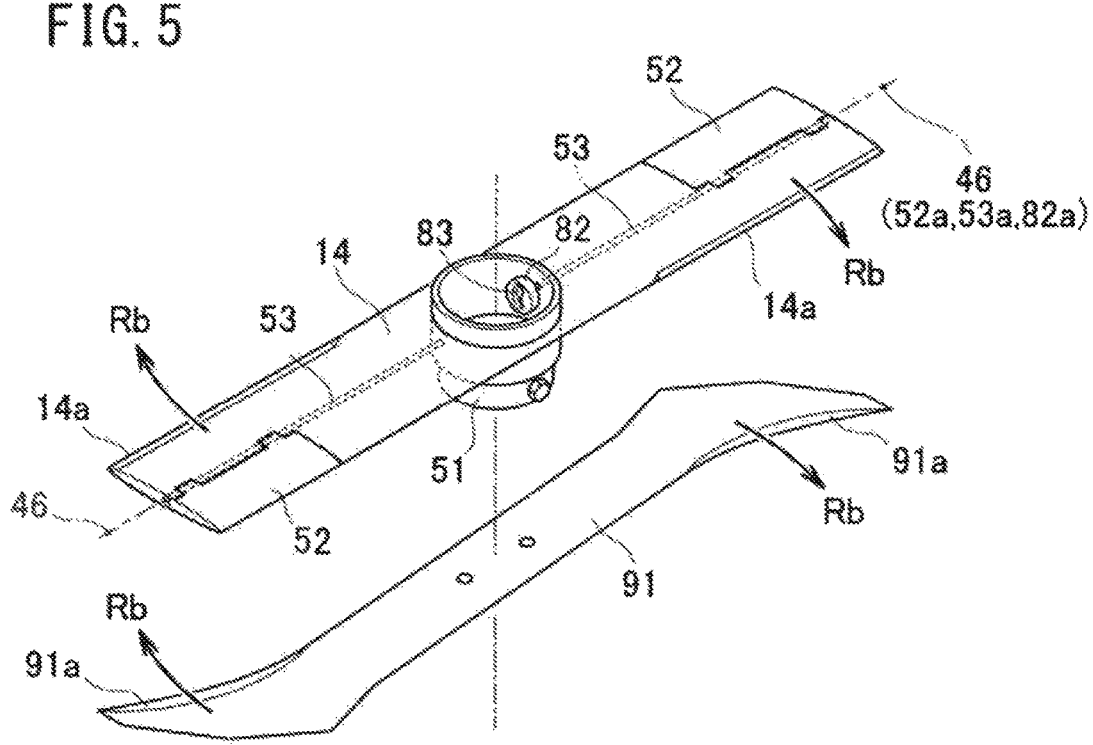
FIG. 5 is an exploded perspective view showing the cutter blade and a lower cutter blade shown in FIG. 3.

As shown in FIGS. 4 and 5, the cutter blade 14 is provided for the rotation shaft 41, and placed in the housing 11. This cutter blade 14 is a long narrow member having a substantially flat plate shape in a plan view, extending in a horizontal line 46 perpendicular to (or substantially perpendicular to) the rotation shaft 41. Both ends of the cutter blade 14 in the longitudinal direction have a pair of blades 14a, at front edges of the cutter blade 14 in the rotation direction.

Further, an annular hub 51 is provided at the center of the cutter blade 14 in the longitudinal direction. The hub 51 is an annular member fitted to an outer circumferential surface of the lower end 41a of the rotation shaft 41. The hub 51 is detachably attached to the lower end 41a by a fixing member such as a bolt. Therefore, the cutter blade 14 is rotatable together with the rotation shaft 41.

Figure 6:
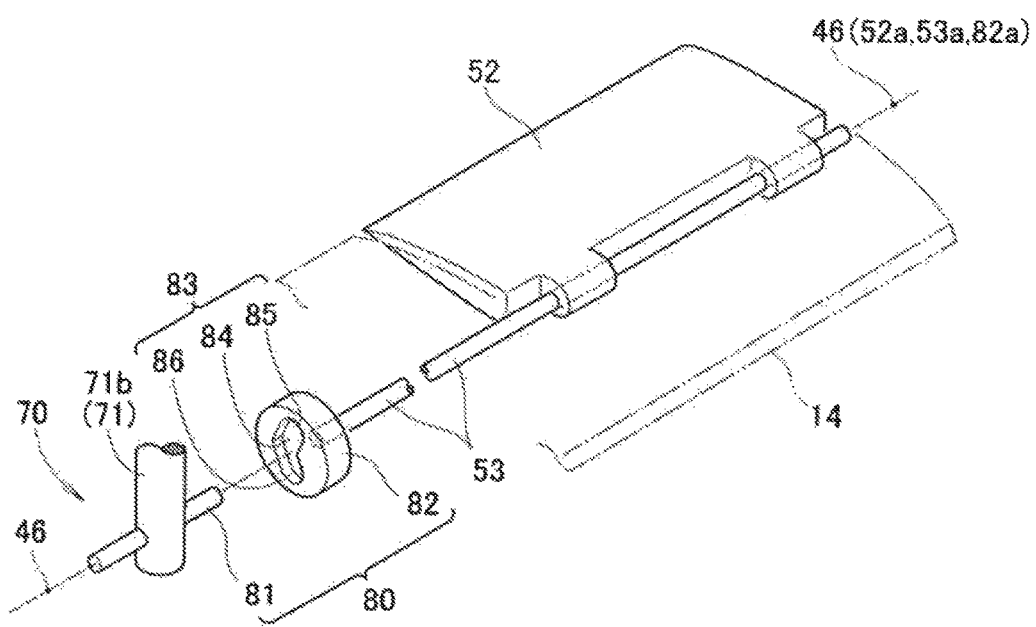
FIG. 6 is an exploded view showing a cutter blade, a flap, and an area around a conversion mechanism shown in FIG. 5.

As shown in FIGS. 3, 5, and 6, flaps 52 are formed at least at part of the cutter blade 14. The range of the flaps 52 in the cutter blade 14 may be any of, only part of the cutter blade 14, the half of the front end of the cutter blade 14, and the entire cutter blade 14.

For example, the flaps 52 are provided at both ends of the cutter blade 14 in the longitudinal direction. The flaps 52 are provided opposite to the pair of blades 14a with respect to the cutter blade 14. The cutter blade 14 is cut out for the space required for providing the flaps 52.

The flap angle (upper and lower swing angles) of the flaps 52 can be changed along the horizontal line 46. More specifically, two flap support shafts 53 (as a pair) are provided on the horizontal line 46. The flap support shafts 53 are provided concentrically with each other. One end of each of the pair of flap support shafts 53 extends through the hub 51, into the space 45 (see FIG. 4) of the lower end 41a of the rotation shaft 41. Further, the one end of each of the pair of the flap support shafts 53 is rotatably supported by the hub 51. The movement of the flap support shaft 53 in the axial direction is restricted.

The pair of flaps 52 is attached to the pair of the flap support shafts 53. In the structure, the flaps 52 can swing in accordance with rotation of the flap support shafts 53 vertically (direction of the upper and lower surfaces of the flaps 52) about the flap support shafts 53. That is, the flaps 52 are auxiliary blades that can swing up and down along the horizontal line 46 (in the longitudinal direction of the cutter blade 14). Hereinafter, the flaps 52 will also be referred to as the "auxiliary blades 52" as necessary.

As shown in FIGS. 3 and 4, the flap angle of the flaps 52 is controlled by an output from an actuator 60. That is, the output of the actuator 60 is transmitted to the flaps 52 by the transmission mechanism 70. This transmission mechanism 70 is accommodated inside the hollow shaft 41 (rotation shaft 41). The transmission mechanism 70 is made up of a control shaft 71 and a conversion mechanism 80.

The control shaft 71 is slidable in the axial direction with respect to the hollow shaft 41, and relative rotation of the control shaft 71 with respect to the hollow shaft 41 is restricted, and the control shaft 71 is fitted into the hollow shaft 41. Specifically, the control shaft 71 is slidable along the hollow shaft 41 by a spline 72, and relative rotation of the control shaft 71 is restricted. It should be noted that the control shaft 71 may adopt structure using serration or parallel keys instead of the spline 72.

The actuator 60 is a linear actuator. That is, an output shaft 60a of the actuator 60 is slidable in the axial direction of the control shaft 71. The output shaft 60a and the control shaft 71 are positioned concentrically with respect to the hollow shaft 41.

The output shaft 60a of the actuator 60 is combined with an upper end 71a of the control shaft 71 in a manner that the control shaft 71 can be driven to move in a sliding manner. More specifically, a recess 73 having a circular shape in cross section is formed at an upper end of the control shaft 71. The recess 73 is opened upward. The output shaft 60a of the actuator 60 is fitted to the recess 73.

Two roller bearings 74, 75 are interposed between the output shaft 60a of the actuator 60 and the control shaft 71. One of the roller bearings 74, 75 is a radial bearing 74, and the other of the roller bearings 74, 75 is a thrust bearing 75. It should be noted that the two roller bearings 74, 75 may comprise needle bearings. The outer circumferential surface of the output shaft 60a is supported by the radial bearing 74 in a manner that the outer circumferential surface of the output shaft 60a is rotatable, and slidable on the inner circumferential surface of the recess 73. The lower end surface of the output shaft 60a rotatably contacts the bottom surface of the recess 73 through the thrust bearing 75. The output shaft 60a moves down to displace the control shaft 71 in a sliding manner through the thrust bearing 75.

A lower end 71b of the control shaft 71 extends into the space 45, and faces an upper surface of the cap 44. A compression coil spring 76 (return spring 76) is interposed between the lower end surface of the control shaft 71 and the upper surface of the cap 44. The compression coil spring 76 biases the control shaft 71 toward the lower end surface of the output shaft 60a of the actuator 60. In the structure, the lower end surface of the output shaft 60a contacts the bottom surface of the recess 73 through the thrust bearing 75 all the time. As the output shaft 60a moves upward, the compression coil spring 76 can displace the control shaft 71 upward in a sliding manner. Consequently, the control shaft 71 is synchronized with forward/backward movement of the output shaft 60a of the actuator 60, and can slide vertically in the same direction as the output shaft 60a.

The conversion mechanism 80 is capable of converting the slide movement of the control shaft 71 into movement to change the flap angle of the flaps 52, i.e., swing movement, and the conversion mechanism 80 is accommodated inside the hollow shaft 41 (i.e., the space 45). That is, the lower end 71b of the control shaft 71 is coupled to the flaps 52 through the conversion mechanism 80.

As shown in FIGS. 4 to 7D, this conversion mechanism 80 includes a pin 81 and a pair of cams 82. The pin 81 extends outside toward both sides in the radial direction from the lower end 71b of the control shaft 71. For example, the pin 81 passes through the lower end 71b in the radial direction.

The two cams 82 (as a pair) are circular disk members. Each of the cams 82 is connected to one end of each of the pair of flap support shafts 53. The pair of cams 82 is rotatable about the pair of the flap support shafts 53, and supported at the lower end 41a of the rotation shaft 41. As described above, the pair of cams 82 is rotatably supported by the hollow shaft 41 about a swing center 52a (horizontal line 46) of the flaps 52, and provided at the flaps 52 by the flap support shafts 53.

The cams 82 have cam surfaces 83 which can contact the pin 81. The cam surfaces 83 face each other. The front end of the pin 81 can contact the cam surfaces 83. These cam surfaces 83 are formed by cam grooves which are configured to convert the sliding movement of the pin 81 which is displaced vertically together with the control shaft 71 into the rotation movement of the cams 82. Hereinafter, the cam surfaces 83 will also be referred to as the "cam grooves 83" as necessary. The outer circumferential surface of the pin 81 slides along the side surfaces of the cam grooves 83, and can be displaced vertically. As a result, the cam 82 is rotated.

Figure 7A:
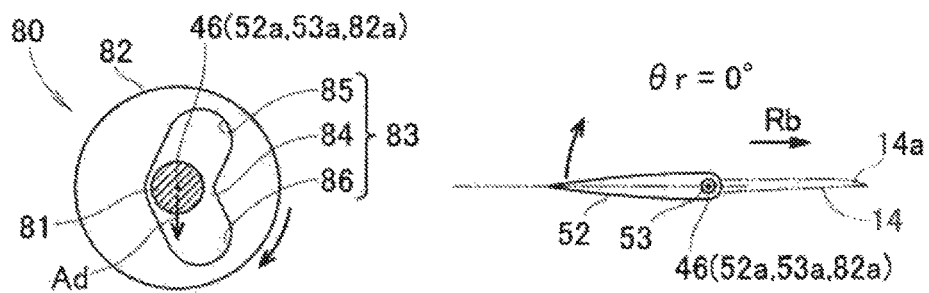
FIG. 7A is a view showing a first relationship between the flap and the conversion mechanism shown in FIG. 6.

As shown in FIGS. 6 and 7A, this cam groove 83 is formed around the swing center 52a of the flap 52, and has a V-shape oriented substantially in a lateral direction. In this regard, the swing center 52a of the flap 52 is in alignment with a center 53a of the flap support shaft 53 and a rotation center 82a of the cam 82. The swing center 52a of the flap 52 is positioned along the horizontal line 46 perpendicular to the rotation shaft 41. More specifically, the cam groove 83 includes a groove center 84 positioned on the rotation center 82a of the cam 82, an upper groove 85 extending upward obliquely from the groove center 84, and a lower groove 86 extending downward obliquely from the groove center 84. The groove center 84, the upper groove 85, and the lower groove 86 are continuous.

Next, operation relationship between the conversion mechanism 80 and the flaps 52 will be described with reference to FIGS. 7A to 7D. FIG. 7A shows the relationship between the conversion mechanism 80 and the flap 52 when the flap 52 is in the horizontal state (flap angle θr=0°). At this time, the pin 81 is positioned at the groove center 84 (the rotation center 82a of the cam 82). The cutter blade 14 is rotated in a direction indicated by an arrow Rb together with the flap 52 in the horizontal state. Thus, the cutter blade 14 can cut (clip) the lawn grass.

Figure 7B:
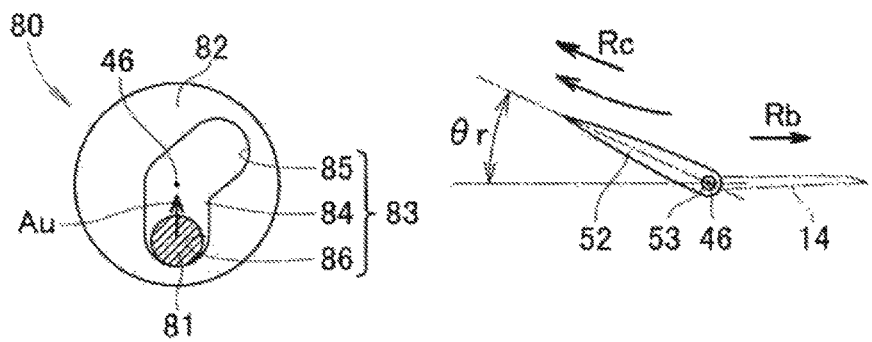
FIG. 7B is a view showing a second relationship between the flap and the conversion mechanism shown in FIG. 6.

Thereafter, the pin 81 is displaced downward (in a direction indicated by an arrow Ad) together with the control shaft 71 shown in FIG. 6, to push the side wall of the lower groove 86 of the cam groove 83 downward. Since the cam 82 and the flap support shaft 53 are rotated clockwise, the flap 52 swings upward. The result is shown in FIG. 7B. The degree of the swing angle θr at which the flap 52 swings from the horizontal state, i.e., the degree of the flap angle θr corresponds to the downward displacement amount of the control shaft 71. By rotation of the cutter blade 14, the flap 52 generates upward air flow Rc.

Thereafter, the pin 81 is displaced upward (in a direction indicated by an arrow Au) together with the control shaft 71 shown in FIG. 6. The pin 81 is in the so-called "missed swing" state where the pin 81 is only displaced upward in the lower groove 86 until the pin 81 returns to the groove center 84. Therefore, the flap angle θr of the flap 52 does not change.

Figure 7C:
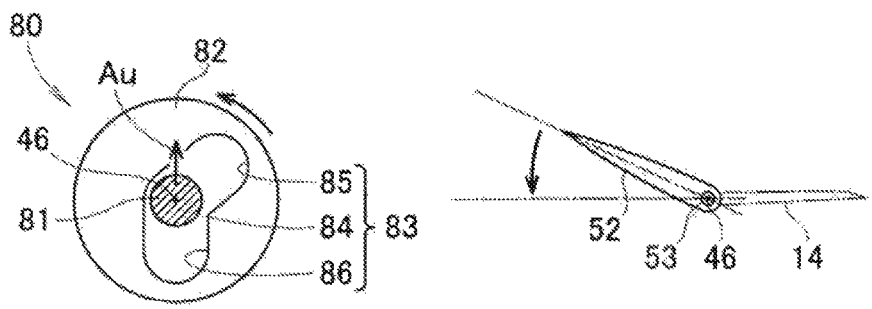
FIG. 7C is a view showing a third relationship between the flap and the conversion mechanism shown in FIG. 6.
Figure 7D:
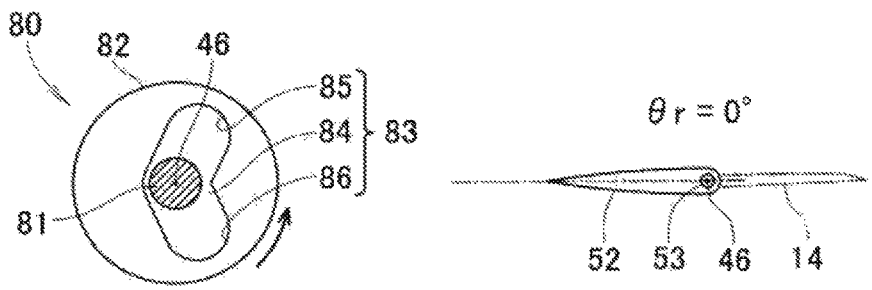
FIG. 7D is a view showing a fourth relationship between the flap and the conversion mechanism shown in FIG. 6.

Thereafter, as shown in FIG. 7C, the pin 81 is displaced further upward from the groove center 84 (in a direction indicated by an arrow Au) to push the side wall of the upper groove 85 upward. Since the cam 82 and the flap support shaft 53 are rotated counterclockwise in the drawing, the flap 52 swings downward. The result is shown in FIG. 7D. The flap 52 returns to the horizontal state (flap angle θr=0°).

The above explanation is summarized below. As shown in FIGS. 4, 5, 7A to 7D, the lawn mower 10 includes the flaps 52 (auxiliary blades 52) provided along the horizontal line 46, at least at part of the cutter blade 14 in a manner that the flap angle θr (swing angle θr) can be changed, the actuator 60 having (generating) an output to control the flap angle θr of the flaps 52, and the transmission mechanism 70 for transmitting the output of the actuator 60 to the flaps 52.

Therefore, the flap angle θr of the flaps 52 of the cutter blade 14 can be set to the optimum angle by the actuator 60 as necessary in accordance with the working condition of the lawn mower 10. Thus, swirl wind can be generated by the flaps 52 efficiently, in accordance with the working condition for lawn mowing operation. The grass clippings can be swirled by the swirl wind efficiently in the housing 11, and transported into the grass clippings container 22 (see FIG. 2) efficiently. Accordingly, it is possible to improve the energy consumption efficiency in the drive source (power source) 15 for driving the cutter blade 14. Further, it is not necessary to change the rotation speed of the cutter blade 14.

Further, it is possible to control the flap angle θr of the flaps 52 in accordance with the load state of the cutter blade 14 and/or the negative pressure state in the housing 11. By controlling the flap angle θr of the flaps 52, it is possible to sufficiently suppress the jamming phenomenon of the grass clippings which may occur in the transportation path of the grass clippings from the housing 11 to the grass clippings container 22.

Further, during the operation at low load where, e.g., the cutter blade 14 is rotated idly, and no grass clipping operation is performed, by decreasing the flap angle θr of the flaps 52, it is possible to reduce the noises such as wind noises. Further, it is possible to improve the noise suppression performance regardless of the rotation speed of the cutter blade 14.

Further, when the grass clippings are blown by the swirl wind to store the grass clippings in the grass clippings container 22, by setting the flap angle θr of the flaps 52 as necessary, it is possible to adjust the distance by which the grass clippings fly over the swirl wind. Consequently, it is possible to efficiently store the grass clippings in the grass clippings container 22.

Further, as shown in FIG. 4, the transmission mechanism 70 is accommodated inside the hollow shaft 41. That is, the transmission mechanism 70 is provided by utilizing the rotation shaft 41 effectively. By accommodating the transmission mechanism 70 in the hollow rotation shaft 41, it is possible to efficiently provide the transmission mechanism 70 in a compact space in the housing 11 efficiently. Further, since the transmission mechanism 70 is not exposed into the housing 11, there is no concern of jamming between the transmission mechanism 70 and the housing 11. Further, the swirl wind generated by the cutter blade 14 or the flaps 52 can flow smoothly into the housing 11 without being obstructed by the transmission mechanism 70. Therefore, though the transmission mechanism 70 is present, it is possible to store the grass clippings efficiently in the grass clippings container 22 by allowing the grass clippings to fly over the swirl wind which flows smoothly.

Further, as shown in FIG. 4, the transmission mechanism 70 includes the control shaft 71 and the conversion mechanism 80. The lower end 71b of the control shaft 71 is coupled to the flaps 52 through the conversion mechanism 80. The output shaft 60a of the actuator 60 is combined with the upper end 71a of the control shaft 71 in a manner that the control shaft 71 can be driven to move in a sliding manner. Thus, the control shaft 71 is driven by the actuator 60 to move in a sliding manner, and the sliding movement of the control shaft 71 can be converted by the conversion mechanism 80 into movement to change the flap angle θr of the flaps 52. As a result, the flap angle θr can be controlled by the actuator 60. Further, the transmission mechanism 70 is made up of the control shaft 71 fitted into the hollow shaft 41 in a slidable manner in the axial direction, and the conversion mechanism 80 accommodated inside the hollow shaft 41. Therefore, the transmission mechanism 70 can be accommodated efficiently in the rotation shaft 41, by effectively utilizing the inner space of the hollow rotation shaft 41.

Further, as shown in FIG. 4, by the cam mechanism made up of the pin 81 and the cams 82, it is possible to form the simple and compact conversion mechanism 80. Further, the sliding movement of the control shaft 71 can be converted into movement of changing the flap angle θr of the flaps 52 promptly.

Further, as shown in FIGS. 4 and 6, the cam groove 83 is formed in a V-shape substantially oriented laterally, around the swing center 52a of the flaps 52. In the structure, by changing the slide direction of driving the control shaft 71 by the actuator 60, it is possible to change the swing direction of the flaps 52. For example, the swing direction of the flaps 52 can be changed from upward to downward. In this case, by reversing rotation of the rotation shaft 41, it is possible to generate an upward air flow by the flaps 52. As described above, the swing direction of the flaps 52 and the rotation direction of the rotation shaft 41 can be combined as necessary, in accordance with the usage condition of the lawn mower 10.

Further, as shown in FIG. 4, the roller bearings 74, 75 are interposed between the output shaft 60a of the linear actuator 60 and the control shaft 71. In the structure, when the control shaft 71 and the hollow shaft 41 are rotated together, the frictional resistance between the output shaft 60a of the linear actuator 60 and the control shaft 71 can be reduced as much as possible. Therefore, even if the control shaft 71 is rotated at high speed, it is possible to promptly and reliably drive the control shaft 71 to move in a sliding manner by the linear actuator 60. Even during rotation of the cutter blade 14, it is possible to set the flap angle θr of the flaps 52 promptly and reliably to the optimum angle in accordance with the working condition of the lawn mower 10.

In this regard, when the cutter blade 14 having the flaps 52 shown in FIGS. 1 and 3 is rotated, it is possible to generate the upward air flow by the flaps 52. The magnitude of this upward air flow depends on the degree of the flap angle θr of the flaps 52. Negative pressure is generated below the cutter blade 14 by the upward air flow. In correspondence with the magnitude of this negative pressure, the degree in which the lawn grass growing on the lawn ground Gr (ground Gr) stands upright changes. For ensuring that the lawn grass after lawn mowing operation has a constant height as much as possible, it is more preferable to adjust the height of the housing 11 having the cutter blade 14 finely.

In this regard, as shown in FIGS. 4 and 5, a lower cutter blade 91 is positioned below the cutter blade 14. This lower cutter blade 91 comprises a fixed blade fixed to the rotation shaft 41 (hollow shaft 41). That is, the lower cutter blade 91 is removably attached to the cap 44 by a fixing member such as a bolt. In the structure, the lower cutter blade 91 is rotatable together with the rotation shaft 41. This lower cutter blade 91 is a narrow and long member having a substantially flat plate shape in a plan view, and basically extends along the cutter blade 14. This lower cutter blade 91 may be positioned in slightly out of phase with the cutter blade 14. Two blades 91a (as a pair) are provided at both ends of the lower cutter blade 91 in the longitudinal direction. The blades 91a are formed on the front edges of the lower cutter blade 91 in the rotation direction Rb.

Therefore, the magnitude of the negative pressure generated below the lower cutter blade 91 by the upward air flow is substantially constant. The degree in which the lawn grass growing on the lawn ground Gr (ground Gr) stands upright is substantially constant. It is possible to keep the height of lawn grass after lawn mowing operation as constant as possible.

Therefore, it is possible to efficiently generate the swirl wind by the flaps 52 of the upper cutter blade 14, and ensure that the lawn grass has the constant height after lawn mowing operation by the lower cutter blade 91 as much as possible.

Figure 8:
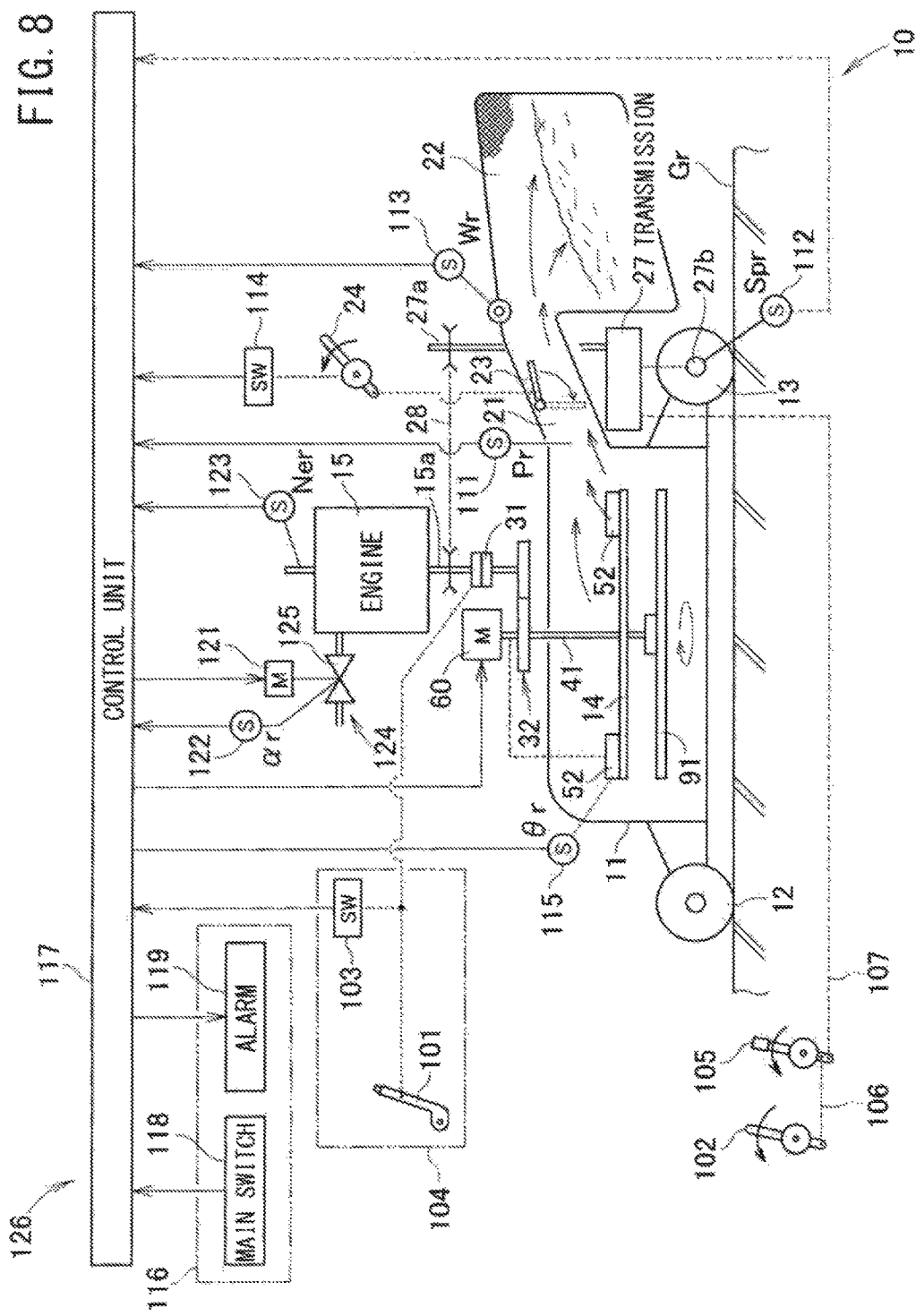
FIG. 8 is a schematic diagram of the lawn mower shown in FIG. 1.

As shown in FIGS. 1 and 8, the operation handle 16 has a substantially arch shape as viewed from the back side of the lawn mower 10, and includes left and right handle bars 16a extending backward, and upward from the housing 11, and a grip 16b bridging the left and right handle bars 16a. A clutch lever 101 and a travel lever 102 are attached to a rear end of the left and right handle bars 16a in a manner that the clutch lever 101 and the travel lever 102 can swing back and forth. The clutch lever 101 and the travel lever 102 have a substantially arch shape along the back side of the operation handle 16, as viewed from the back side of the lawn mower 10. The clutch lever 101 and the travel lever 102 can be gripped together with the grip 16b by a hand when swung to the front side. The clutch lever 101 and the travel lever 102 are automatic return type operation members, such that when these levers 101, 102 are released from the hand, the levers 101, 102 return to their original positions automatically.

The clutch lever 101 is an operation member for switching the clutch 31. Only in the state where the clutch lever 101 and the grip 16b are gripped together by the hand, the clutch 31 is placed in the ON state. As a result, the cutter blade 14 can be placed in the operating state. When the clutch lever 101 is released from the hand, the clutch 31 automatically returns to the OFF state. As a result, the cutter blade 14 can be placed in the stop state.

The operation position of the clutch lever 101 is detected by a clutch operation detection sensor 103. For example, the clutch operation detection sensor 103 may comprise a switch. When the clutch 31 is switched on by the clutch lever 101, i.e., when the cutter blade 14 is switched to the operating state, the clutch operation detection sensor 103 detects an operation switch position, and outputs an operation switch signal. That is, when the clutch 31 is operated for switching from the stop state to the operation state by the clutch lever 101, the clutch operation detection sensor 103 outputs "an operation switch signal".

When the clutch 31 is turned off by the operation clutch lever 101, i.e., when the cutter blade 14 is switched to the stop state, the clutch operation detection sensor 103 detects an operation stop switch position to output a stop switch signal.

The combination structure of the clutch lever 101 and the clutch operation detection sensor 103 constitutes the blade switching unit 104. The blade switching unit 104 switches the clutch 31 for switching the cutter blade 14 between the operation state and the stop state. When the blade switching unit 104 switches the clutch 31 from the stop state to the operating state, the blade switching unit 104 outputs an operation switch signal. That is, the clutch operation detection sensor 103 in the blade switching unit 104 outputs the operation switch signal.

As long as the blade switching unit 104 can perform switching of the cutter blade 14 between the operating state and the stop state, the blade switching unit 104 may have any structure. For example, the blade switching unit 104 only includes an operation switch. By the operation switch, it is possible to electrically switch the state of the clutch 31 between ON and OFF. In this case, when the operation switch switches the clutch 31 to the ON state, i.e., switches the cutter blade 14 to the operating state, the operation switch outputs an operation switch signal. In this case, when the operation switch switches the clutch 31 to the OFF state, i.e., switches the cutter blade 14 to the stop state, the operation switch outputs a stop switch signal.

Hereinafter, the blade switching unit 104 (including the operation switch) will also be referred to as the "blade switch 104" as necessary.

A shift lever 105 is provided on the back side of the left or right handle bar 16a. The shift lever 105 performs transmission operation of the transmission 27. The shift lever 105 is connected to the travel lever 102 through a tension spring 106, and coupled to a transmission arm of the transmission 27 through a transmission cable 107. When the travel lever 102 is operated, the transmission 27 rotates the rear wheels 13 at the speed in correspondence with the transmission operation position of the shift lever 105. Thereafter, the travel lever 102 is returned to its original position, and the output rotation of the transmission 27 becomes zero, and the rear wheels 13 are stopped.

The lawn mower 10 includes an internal pressure detection unit 111, a travel speed detection unit 112, a grass clippings container weight detection unit 113, a mode switch 114, a flap angle detection unit 115, an operation unit 116, and a control unit 117. The operation unit 116 and the control unit 117 are positioned adjacent to the engine 15 (drive source 15) or at the operation handle 16. The operation unit 116 includes a main switch 118 and an alarm 119.

The internal pressure detection unit 111 detects the internal pressure Pr of the housing 11, and outputs a detection signal. For example, the internal pressure detection unit 111 is positioned between the housing 11 and the mode switch damper 23, in the grass clippings discharge passage 21.

The travel speed detection unit 112 detects the travel speed Spr (vehicle velocity Spr) of the lawn mower 10, and outputs a detection signal. For example, the travel speed detection unit 112 detects the rotation speed of the wheel shaft 27b of the rear wheels 13 to indirectly detect the vehicle velocity Spr of the lawn mower 10.

The grass clippings container weight detection unit 113 detects the weight Wr of the grass clippings container 22, and outputs a detection signal. For example, the grass clippings container weight detection unit 113 detects the weight Wr of the grass clippings container 22 directly or indirectly. The grass clippings container 22 is detachably attached to the outlet of the grass clippings discharge passage 21. The weight Wr of the grass clippings container 22 is applied to this outlet. Further, moment of this weight Wr is applied to the outlet. In accordance with the magnitude of this moment, the grass clippings container 22 attempts to swing (rotate) downward relative to the outlet. By detecting this swing angle (rotation angle), the grass clippings container weight detection unit 113 can detect the weight Wr of the grass clippings container 22 indirectly. Further, by detecting the weight Wr applied to the outlet, the grass clippings container weight detection unit 113 can detect the weight Wr of the grass clippings container 22 indirectly.

The mode switch 114 detects a switch position of the mode switch damper 23, and outputs a detection signal. That is, the mode switch 114 is a mode switch detection unit for outputting a switch signal corresponding to opening/closing of the mode switch damper 23. Hereinafter, the mode switch 114 will also be referred to as the "mode switch detection unit 114" as necessary. This mode switch 114 directly detects an opening/closing position of the mode switch damper 23 or detects a lever position of the damper operation lever 24 to indirectly detect the opening/closing position of the mode switch damper 23. Then, after the mode switch 114 detects that the mode switch damper 23 is at an open position, the mode switch 114 outputs an open signal, i.e., a bagging mode signal. Further, after the mode switch 114 detects that the mode switch damper 23 is at a closed position, the mode switch 114 outputs a close signal, i.e., a mulching mode signal.

The mode switching unit 24 is not limited to the damper operation lever. Power means such as an electric motor may be used as the mode switching unit 24. In such a case, the mode switching unit 24 comprising the power means can be switched by the mode switch 114. The mode switch 114 in this case plays a role of the "mode switch detection unit" for outputting a switch signal in correspondence with opening/closing of the mode switch damper 23, and additionally, plays a role of the "operation switch" for switching the mode switching unit 24 comprising the power means.

In this case, when the mode switch damper 23 is operated by the mode switch detection unit 114 (mode switch 114) comprising the operation switch, for switching to the open position, the mode switch detection unit 114 outputs the bagging mode signal. Further, when the mode switch damper 23 is operated by the mode switch detection unit 114, for switching to the closed position, the mode switch detection unit 114 outputs the mulching mode signal.

The flap angle detection unit 115 detects the flap angle θr of the flaps 52, and outputs a detection signal. For example, the flap angle detection unit 115 detects the axial position of the output shaft 60a of the actuator 60, the axial position of the control shaft 71, and the rotation angle of the flap support shaft 53 shown in FIG. 3 to indirectly detect the flap angle θr of the flaps 52.

The main switch 118 comprises a rotary switch for turning on/off the power supply system of the lawn mower 10. For example, in the case where the drive source 15 comprises an engine, the main switch 118 comprises an ignition switch.

The ignition switch 118 (main switch 118) is capable of switching among an OFF position, an ON position, and a start position.

By operating the ignition switch 118 for switching from the OFF position to the ON position, the power supply system of the lawn mower 10 is turned on to prepare for starting operation of the engine 15. By operating the ignition switch 118 for switching from the ON position to the start position (ST position), it is possible to start operation of the engine 15. After operation of the engine 15 is started, the ignition switch 118 is returned from the start position to the ON position.

By returning the ignition switch 118 from the ON position to the OFF position, it is possible to stop operation of the engine 15, and stop the power supply system of the lawn mower 10.

As described above, the main switch 118 is operated for switching between the start and stop of operating the engine 15 (drive source 15). Hereinafter, the main switch 118 (ignition switch 118) will also be referred to as the "drive source operation switch 118" as necessary.

The alarm 119 issues notifications visually or by outputting sounds in accordance with instructions from the control unit 117.

Next, the system of the engine 15 will be described. The engine 15 includes a throttle valve control motor 121, a throttle opening angle detection unit 122, and an engine speed detection unit 123. The throttle valve control motor 121 is an actuator for opening/closing a throttle valve 125 of an engine intake system 124. For example, the throttle valve control motor 121 is a step motor. The throttle opening angle detection unit 122 detects the opening angle αr of the throttle valve 125, and outputs a detection signal.

The engine speed detection unit 123 detects the rotation speed Ner (rotation number Ner) of the engine 15, and outputs a detection signal. When the engine 15 (drive source 15) in the rotating state is stopped, the value of the rotation speed Ner becomes substantially "zero". When the engine speed detection unit 123 detects that the value of the rotation speed Ner becomes substantially "zero", i.e., detects that the engine 15 (drive source 15) in the rotating state has been stopped, the engine speed detection unit 123 outputs a drive source stop signal. Hereinafter, the engine speed detection unit 123 will also be referred to as the "stop detection unit 123" as necessary.

The control unit 117 is an electronic control unit for controlling the engine 15 in a predetermined control mode by receiving signals from the main switch 118 or various detection units. For example, the control unit 117 is a microcomputer. That is, based on various items of data such as the detected rotation speed Ner of the engine 15 and the opening angle αr of the throttle valve 125, by controlling the opening angle αr of the throttle valve 125 through the throttle valve control motor 121 in a predetermined control mode, electrical control is implemented in a manner that the rotation speed Ner of the engine 15 matches the target rotation speed. Further, the control unit 117 electrically controls the flap angle θr of the flaps 52 by receiving signals from the main switch 118 and/or various detection units.

As can be seen from the above explanation, the engine 15 is characterized by mounting an electronic governor 126 (also referred to as the electric governor, or electric speed governor). The electronic governor 126 controls the rotation speed Ner of the engine 15 based on the control signal from the control unit 117 by automatically adjusting the opening angle αr of the throttle valve 125 by the throttle valve control motor 121. The electronic governor 126 is made up of combination of the control unit 117, the throttle valve control motor 121, the throttle opening angle detection unit 122, the engine speed detection unit 123, and the throttle valve 125.

Next, the control flow in the case where the control unit 117 (see FIG. 8) comprises a microcomputer will be described with reference to FIGS. 9 to 17. In the control flow chart shown in FIGS. 9 to 17, among the steps for controlling the lawn mower 10, only the steps regarding control of the rotation speed Ner of the drive source 15 and the flap angle θr of the flaps 52 will be described, and explanation about the steps regarding other items of control is omitted. Further, in this control flow, explanation about a case where the drive source 15 is an engine, and the main switch 118 is an ignition switch will be given as an example. Hereinafter, the explanation will be given with reference to FIGS. 3, 4, and 8.

Figure 9:
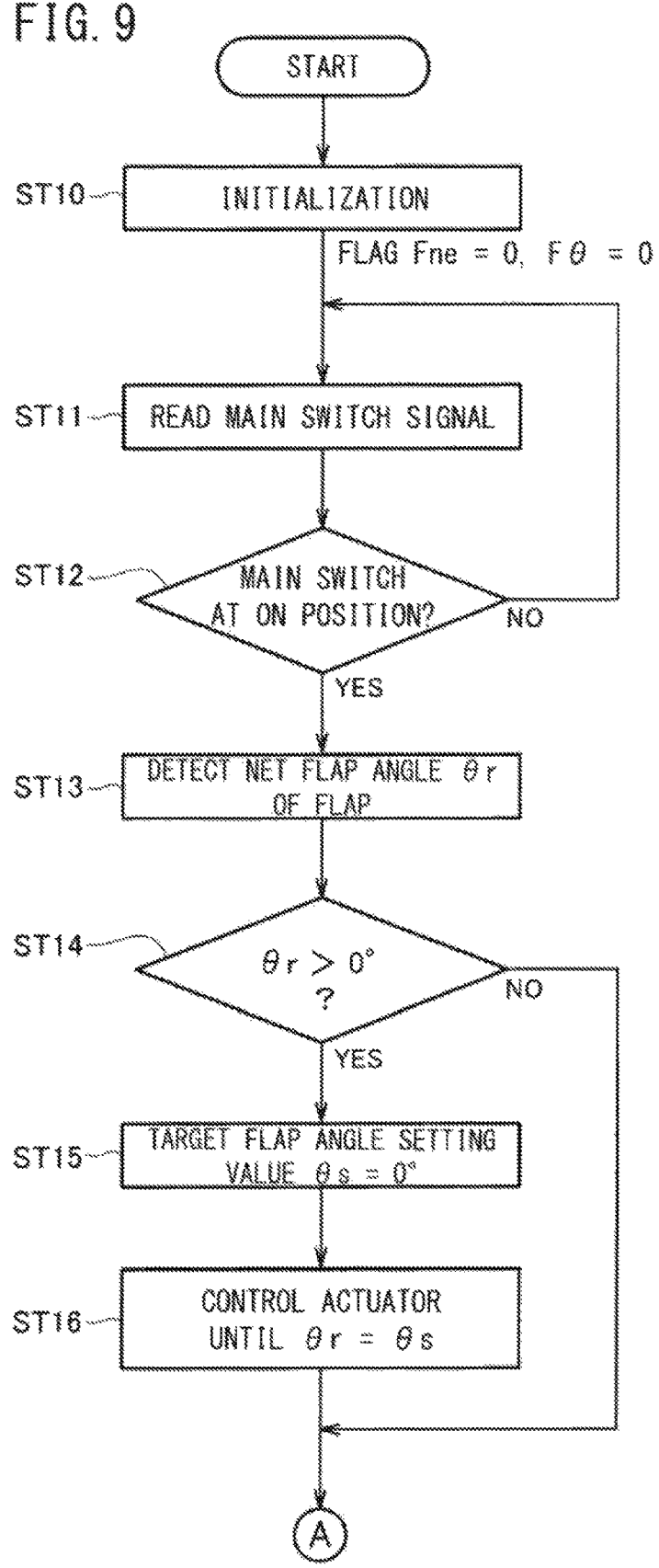
FIG. 9 shows the former part of a control flow chart of the control unit shown in FIG. 8.
Figure 10:
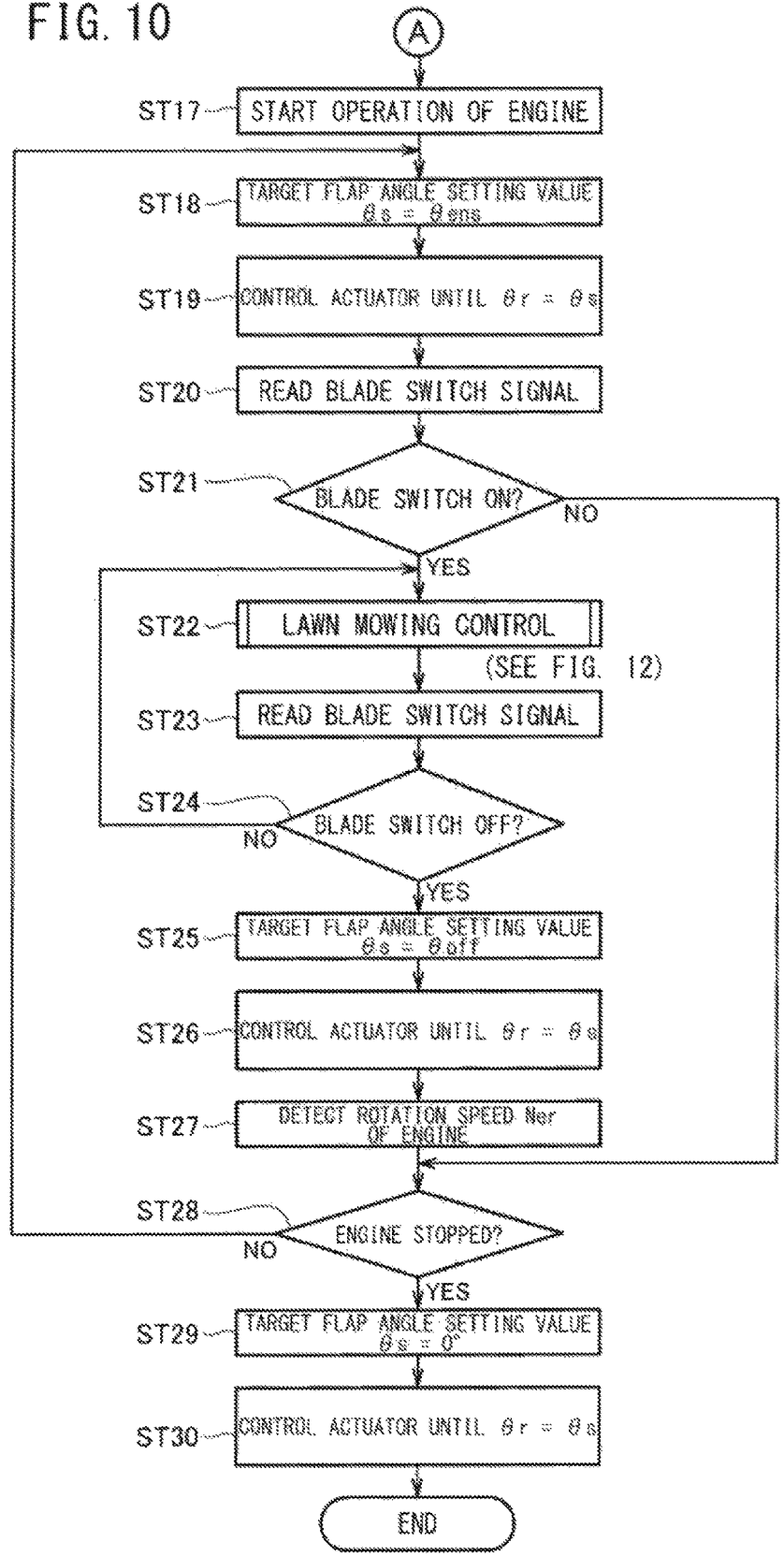
FIG. 10 shows the latter part of the control flow chart of the control unit shown in FIG. 8.

FIGS. 9 and 10 show a control flow chart of the control unit 117 according to the present invention. When control is started, firstly, in step ST10, the control unit 117 performs initialization for setting each of setting values and flags to an initial value. For example, an engine rotation speed constant control flag Fne is set to "0", and a flap angle control flag Fθ is set to "0".

Next, a signal of the main switch 118 is read (step ST11). Then, it is determined whether or not the main switch 118 is turned on, i.e., whether or not the main switch 118 is at the ON position (step ST12). A series of steps ST11 to ST12 are repeated until the main switch 118 is switched to the ON position. In the case where the main switch 118 is at the ON position, the control unit 117 determines that an operation start signal has been received from the main switch 118, and the control proceeds to the next step ST13. As described above, in the state where the flaps 52 stand upright, after the flaps 52 are placed in the horizontal state, it becomes possible to start operation of the engine 15.

Then, the actual flap angle θr (net flap angle θr) of the flaps 52 is detected by the flap angle detection unit 115 (step ST13). Then, it is determined whether or not the actual flap angle θr is larger than zero (θr>0°). That is, it is determined that the flaps 52 are in the horizontal state (step ST14). If it is determined that the actual flap angle θr is larger than zero (θr>0°), in the next step ST15, the target flap angle setting value θs of the flaps 52 is set to 0° (θs=0°). Next, the actuator 60 is controlled until the net flap angle θr of the flaps 52 becomes equal to the target flap angle setting value θs (θr=θs) (step ST16), and then, the control proceeds to step ST17. In step ST14, if it is determined that the net flap angle θr=0, the control proceeds to step ST17 directly. In step ST17, when the main switch 118 is operated for switching from the ON position to the start position, operation of the engine 15 is started.

When operation of the engine 15 is started, in the next step ST18, the target flap angle setting value θs of the flaps 52 is set to a predetermined reference value θens at the time of starting operation of the engine 15 (θs=θens). Then, in step ST19, the actuator 60 is controlled until the net flap angle θr of the flaps 52 becomes equal to the target flap angle setting value θs (θr=θs). As described above, when operation of the engine 15 is started, the flaps 52 are oriented upright until the flap angle θens at the time of starting operation of the engine 15.

Next, a signal of the blade switch 104 is read (step ST20). Then, it is determined whether or not the blade switch 104 is in the ON state (step ST21). At this time, if it is determined that the blade switch 104 is in the OFF state, the control proceeds to step ST28 described later, and it is determined whether or not the engine 15 has been stopped. If it is determined that the blade switch 104 is in the ON state, the control proceeds to the next step ST22. In this step S22, lawn mowing control is performed. Specific control flow for performing the lawn mowing control process in step ST22 will be described with reference to FIG. 12.

After step ST22, a signal of the blade switch 104 is read (step ST23). Then, it is determined whether or not the blade switch 104 is in the OFF state (step ST24). A series of steps ST22 to ST24 are repeated until the blade switch 104 is turned off. That is, while the blade switch 104 is in the ON state, lawn mowing control of the step ST22 is continued. If the blade switch 104 is in the OFF state, in the next step ST25, the target flap angle setting value θs of the flaps 52 is set to a predetermined blade stop reference value θoff at the time of stopping the cutter blade 14 (θs=θoff). Then, in step ST26, the actuator 60 is controlled until the net flap angle θr of the flaps 52 becomes equal to the target flap angle setting value θs (θr=θs).

In the next step ST27, the actual rotation speed Ner (net rotation speed Ner) of the engine 15 is detected by the engine speed detection unit 123. Next, it is determined whether or not the engine 15 has been stopped (step ST28). It is determined that the net rotation speed Ner has not been decreased to zero or substantially 0 (Ner=0 or Ner≈0), it is determined that the engine 15 is in the middle of operation. If it is determined that the engine 15 is in the middle of operation, the control returns to step ST18 to directly perform the lawn mowing control process according to the ON/OFF state of the blade switch 104. In step ST28, if it is determined that the engine 15 has been stopped, the control proceeds to the next step ST29.

In step ST29, the target flap angle setting value θs of the flaps 52 is set to 0° (θs=0°). Next, the actuator 60 is controlled (step ST30) until the net flap angle θr of the flaps 52 becomes equal to the target flap angle setting value θs (θr=θs), and then, this control flow is finished. As described above, when the engine 15 is stopped, the flaps 52 are returned to the horizontal state. Therefore, at the time of starting operation of the engine 15 again, it is possible to reduce the rotation load on the cutter blade 14.

Figure 11:
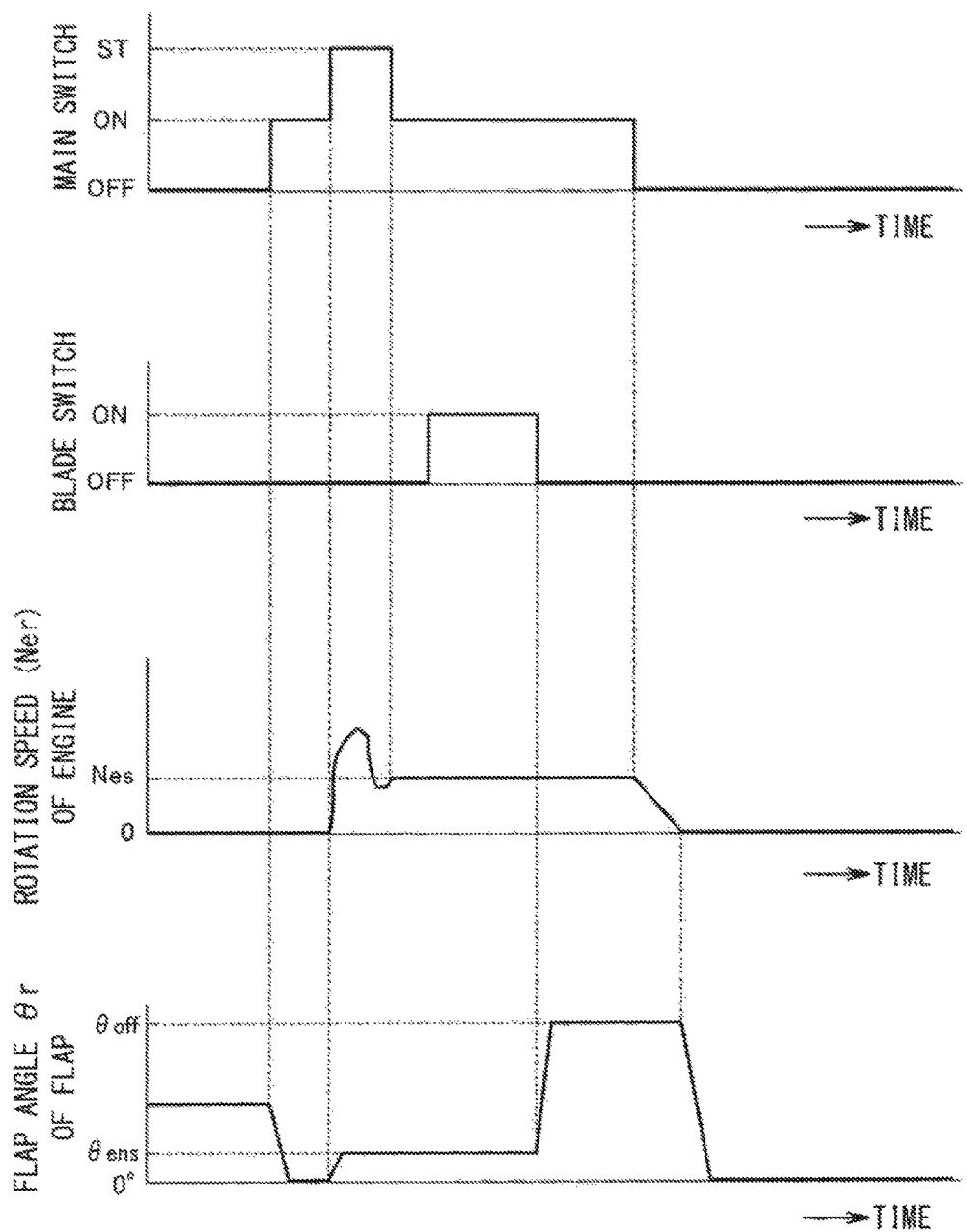
FIG. 11 is an operation diagram of the lawn mower shown in FIG. 8.

Next, operation of each component at the time of performing the control flow shown in FIGS. 9 and 10 will be described with reference to FIG. 11. FIG. 11 is a time chart of the lawn mower 10, showing operation of each component. In the time chart, the horizontal axis denotes time.

Now, it is assumed that the main switch 118 is off (at the OFF position), the blade switch 104 is off, and the engine 15 is in the stop state. The net flap angle θr of the flaps 52 is larger than zero (θr>0°).

Thereafter, when the main switch 118 is operated for switching to the ON position, the net flap angle θr of the flaps 52 becomes zero (θr=0°). Thereafter, when the main switch 118 is operated for switching to the start position (ST position), operation of the engine 15 is started. Immediately after that, the net flap angle θr of the flaps 52 is changed to orient the flaps 52 upright until the flap angle θens at the time of starting operation of the engine 15. Thereafter, the main switch 118 is returned to the ON position. The engine 15 maintains the rotation speed Nes in the idling state.

Thereafter, the blade switch 104 is turned on to rotate the cutter blade 14. After that, by returning the blade switch 104 off again, the cutter blade 14 begins to stop its operation. At this time, the net flap angle θr of the flaps 52 is changed to orient the flaps 52 upright, until the blade stop reference value θoff. Consequently, since the rotation resistance of the cutter blade 14 is increased, the cutter blade 14 is stopped promptly.

Thereafter, when the main switch 118 is returned to the off position (OFF position), the engine 15 begins to stop its operation. When the net rotation speed Ner of the engine 15 is decreased to zero or substantially zero (Ner=0 or Ner≈0), the flaps 52 are again placed in the horizontal state.

As long as the stop detection unit 123 can detect that at least one of the rotating engine 15 (drive source 15) and the rotating cutter blade 14 has stopped, and can output a stop signal, the stop detection unit 123 may have any structure. For example, the stop detection unit 123 may have double structures including a drive source stop detection unit for detecting that the rotating engine 15 has been stopped, and outputting a stop signal, and a blade stop detection unit for detecting that the rotating cutter blade 14 has been stopped, and outputting a stop signal.

This blade stop detection unit detects the rotation speed of the cutter blade 14. When the rotating cutter blade 14 is stopped, the value of the rotation speed becomes substantially "zero". When the blade stop detection unit detects that the value of the rotation speed of the cutter blade 14 became substantially "zero", i.e., detects that the rotating cutter blade 14 has been stopped, the blade stop detection unit outputs a stop signal.

Further, the control unit 117 may have any structure, as long as the control unit 117 controls the actuator 60 to place the flaps 52 in the substantially horizontal state, upon reception of at least one of a start operation control signal from the drive source operation switch 118 and an operation switch signal from the blade switching unit 104, and thereafter, start operation of the drive source 15 or start rotation of the cutter blade 14 upon reception of a signal from the flap angle detection unit 115 indicating that the flaps 52 have been placed in the horizontal state again.

The above explanation is summarized as follows. The control unit 117 is configured to control the actuator 60 to increase the flap angle θr of the flaps 52 if the control unit 117 determines that a stop switching operation signal has been received from the blade switching unit 104. Therefore, when the cutter blade 14 is operated for switching from the rotation state to the stop state, the flap angle θr of the flaps 52 is increased. That is, the flaps 52 are oriented upright. The air resistance of the flaps 52 which rotate together with the cutter blade 14 is increased. Therefore, it is possible to stop the cutter blade 14 promptly. Thus, the operator can smoothly go on to the next operation. Accordingly, it is possible to improve the work efficiency of the lawn mower 10.

Further, the control unit 117 controls the actuator 60 to place the flaps 52 in the substantially horizontal state if the control unit 117 determines that a stop signal has been received from the stop detection unit 123 (drive source stop detection unit and/or the blade stop detection unit). Therefore, when the rotating drive source 15 or the rotating cutter blade 14 is stopped, the flaps 52 are placed in the horizontal state. Even in the case of rotating the cutter blade 14 at the time of restarting operation of the drive source 15 or the case of restarting operation of the cutter blade 14 during rotation of the drive source 15, it is possible to reduce the air resistance by the flaps 52 as much as possible. Accordingly, it is possible to improve the efficiency in restarting operation of the drive source 15. Consequently, it is possible to improve the work efficiency of the lawn mower 10.

Further, the control unit 117 controls the actuator 60 to place the flaps 52 in the substantially horizontal state, upon reception of at least one of a start operation control signal from the drive source operation switch 118 and an operation switch signal from the blade switching unit 104, and thereafter, implements control to start operation of the drive source 15 or start rotation of the cutter blade 14 after receiving a signal from the flap angle detection unit 115 indicating that the flaps 52 are placed in the horizontal state again.

Therefore, when the drive source operation switch 118 is operated to start operation, after the flaps 52 are placed in the horizontal state, it is possible to start operation of the drive source 15. If the flaps 52 are in the horizontal state, it is possible to directly start operation of the drive source 15. Therefore, even in the case of rotating the cutter blade 14 at the time of starting operation of the drive source 15, it is possible to reduce the air resistance by the flaps 52 as much as possible. Accordingly, it is possible to improve the efficiency of starting operation of the drive source 15. Consequently, it is possible to improve the work efficiency of the lawn mower 10.

Further, when the blade switching unit 104 is switched to the operation state, after the flaps 52 are placed in the horizontal state, it is possible to start rotation of the cutter blade 14. If the flaps 52 are in the horizontal state, it is possible to start rotation of the drive source 15 and/or the cutter blade 14 directly. Therefore, at the time of rotating the cutter blade 14, it is possible to reduce the air resistance by the flaps 52 as much as possible. Accordingly, it is possible to improve the efficiency of starting operation of the cutter blade 14. Consequently, it is possible to improve the work efficiency of the lawn mower 10.

As describe above, the lawn mower 10 can generate the swirl wind efficiently in accordance with the working condition of the lawn mowing operation. Further, when operation of the cutter blade 14 is switched from the rotation state to the stop state, it is possible to promptly stop the cutter blade 14.

Figure 12:
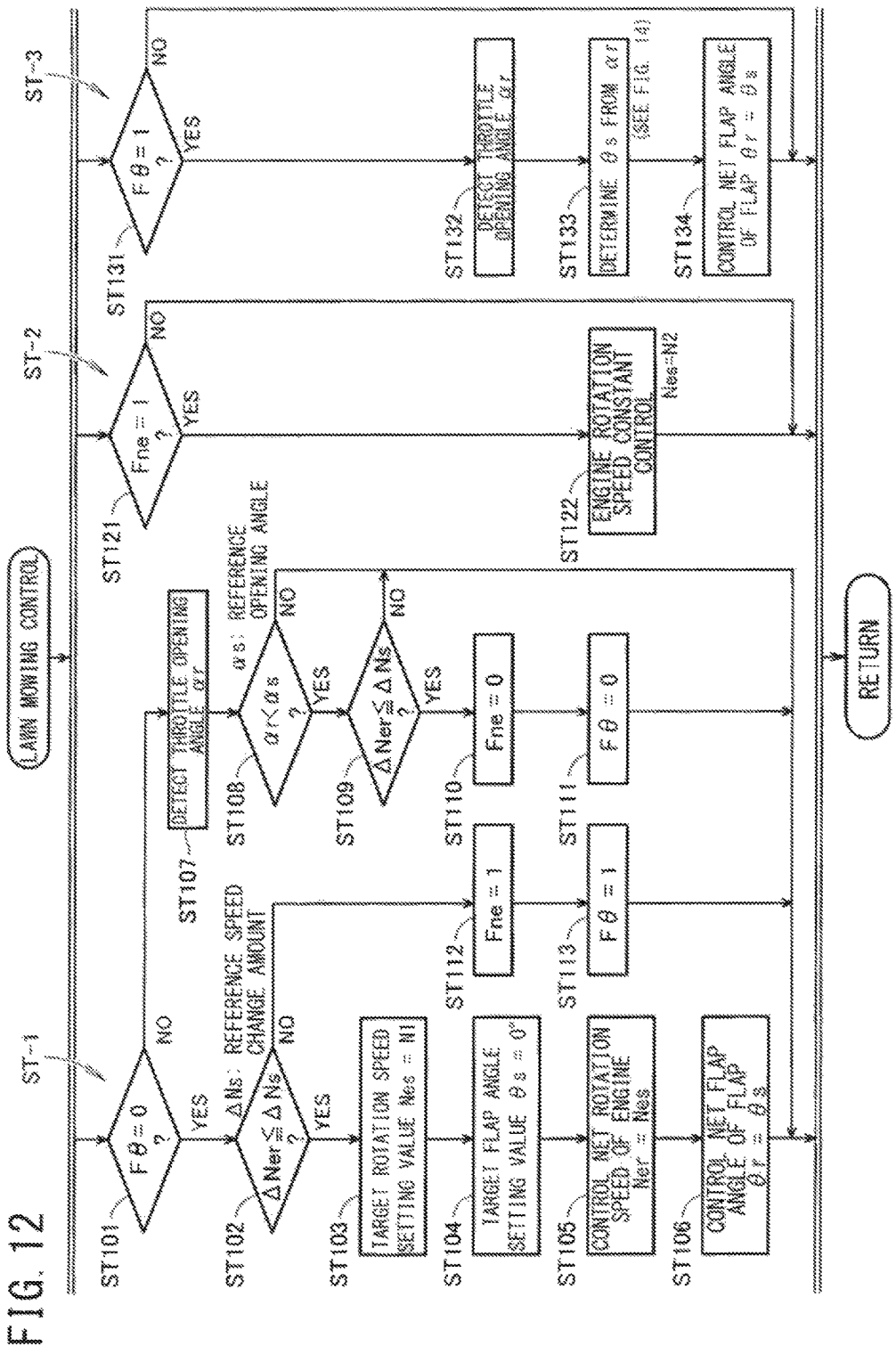
FIG. 12 shows a sub-routine of step ST22 of a control flow chart shown in FIG. 10.

FIG. 12 shows a sub-routine for performing a lawn mowing control process shown in step ST22 of FIG. 10. FIG. 10 shows a sub-routine of parallel processing of three control steps ST-1, ST-2, and ST-3.

In the first control step ST-1, firstly, it is determined whether or not the flap angle control flag Fθ is zero (Fθ=0) (step ST101). If it is determined that Fθ=0, the control proceeds to step ST102. If it is determined that Fθ≠0, the control proceeds to step ST107.

In step ST102, it is determined whether or not a rotation speed change amount ΔNer of the engine 15 does not exceed a predetermined reference speed change amount ΔNs (ΔNer≤ΔNs). This rotation speed change amount ΔNer is determined successively every predetermined fixed minute time by an interruption routine, e.g., shown in FIG. 13. This interruption routine will be described later. In step ST102, if it is determined that the rotation speed change amount ΔNer of the engine 15 does not exceed the reference speed change amount ΔNs (ΔNer≤ΔNs), the control proceeds to step ST103. If it is determined that the rotation speed change amount ΔNer of the engine 15 exceeds the reference speed change amount ΔNs (ΔNer>ΔNs), the control proceeds to step ST112.

In step ST103, the value of the target rotation speed Nes of the engine 15 is set to predetermined first reference rotation speed N1 (Nes=N1). In the next step ST104, the target flap angle setting value θs of the flaps 52 is set to 0° (θs=0°). In the next step ST105, the actual rotation speed Ner (net rotation speed Ner) of the engine 15 is controlled until it becomes equal to the target rotation speed Nes (Ner=Nes). The net rotation speed Ner is detected by the engine speed detection unit 123. In the next step ST106, the actuator 60 is controlled until the net flap angle θr of the flaps 52 becomes equal to the target flap angle setting value θs (θr=θs), and then, the control returns to step ST22.

In the above step ST101, if it is determined that Fθ≠0, the actual opening angle αr (net opening angle αr) of the throttle valve 125 is detected by the throttle opening angle detection unit 122 (step ST107).

Next, in step ST108, it is determined whether or not the net opening angle αr of the throttle valve 125 is below the predetermined reference opening angle αs (αr<αs). If it is determined the net opening angle αr of the throttle valve 125 is below the predetermined reference opening angle αs (αr<αs), the control proceeds to step ST109. If it is determined the net opening angle αr of the throttle valve 125 is not below the predetermined reference opening angle αs, the control returns to step ST22.

In step ST109, it is determined whether or not the rotation speed change amount ΔNer of the engine 15 does not exceed the predetermined reference speed change amount ΔNs (ΔNer≤ΔNs). This rotation speed change amount ΔNer is determined successively every predetermined fixed minute time by an interruption routine, e.g., shown in FIG. 13. In step ST109, if it is determined that the rotation speed change amount ΔNer of the engine 15 does not exceed the reference speed change amount ΔNs (ΔNer≤ΔNs), the control proceeds to step ST110. If it is determined that the rotation speed change amount ΔNer of the engine 15 exceeds the reference speed change amount ΔNs (ΔNer>ΔNs), the control returns to step ST22.

In step ST110, the engine rotation speed constant control flag Fne is set to "0" (Fne=0). Next, in step ST111, the flap angle control flag Fθ is set to "0" (Fθ=0), and then, the control returns to step ST22.

Further, in the above step ST102, if it is determined that the rotation speed change amount ΔNer of the engine 15 exceeds the reference speed change amount ΔNs (ΔNer>ΔNs), the control proceeds to the next step ST112 and the engine rotation speed constant control flag Fne is set to "1" (Fne=1). Next, in step ST113, the flap angle control flag Fθ is set to "1" (Fθ=1), and then, the control returns to step ST22.

In the second control step ST-2, firstly, it is determined whether or not the engine rotation speed constant control flag Fne=1 (step ST121). If it is determined that Fne=1, the control proceeds to step ST122. If it is determined that Fne≠1, the control returns to step ST22 directly.

In the control of step ST122, the net rotation speed Ner of the engine 15 is kept constant, and then, the control proceeds to step ST22. In this step ST122, the value of the target rotation speed Nes of the engine 15 is set to a predetermined second reference rotation speed N2 (Nes=N2). The second reference rotation speed N2 is higher than the first reference rotation speed N1 by a predetermined speed (N2>N1). That is, in this step ST122, regardless of the magnitude of the load (lawn load) of the cutter blade 14, the opening angle αr of the throttle valve 125 and the flap angle θr of the flaps 52 are controlled automatically.

As described above, when control is implemented to keep the rotation speed Ner of the engine 15 constant, the electronic governor 126 keeps the rotation speed Ner of the engine 15 constant by increasing the opening angle αr of the throttle valve 125, and controlling the actuator 60 to increase the flap angle θr of the flaps 52 as the load on the engine 15 gets higher.

In the third control step ST-3, firstly, it is determined whether or not the flap angle control flag Fθ=1 (step ST131). If it is determined that Fθ=1, the control proceeds to step ST132. If it is determined that Fθ ≠1, the control directly returns to step ST22.

In step ST132, the actual opening angle αr (net opening angle αr) of the throttle valve 125 is detected by the throttle opening angle detection unit 122. Next, in step ST133, the target flap angle setting value θs is determined from the value of the net opening angle αr of the throttle valve 125. For example, the target flap angle setting value θs can be determined from the net opening angle αr based on a map or a calculation formula shown in FIG. 14. The map will be described later. Next, in step ST134, the actuator 60 is controlled until the net flap angle θr of the flaps 52 becomes equal to the target flap angle setting value θs (θr=θs), and then, the control returns to step ST22.

Figure 13:
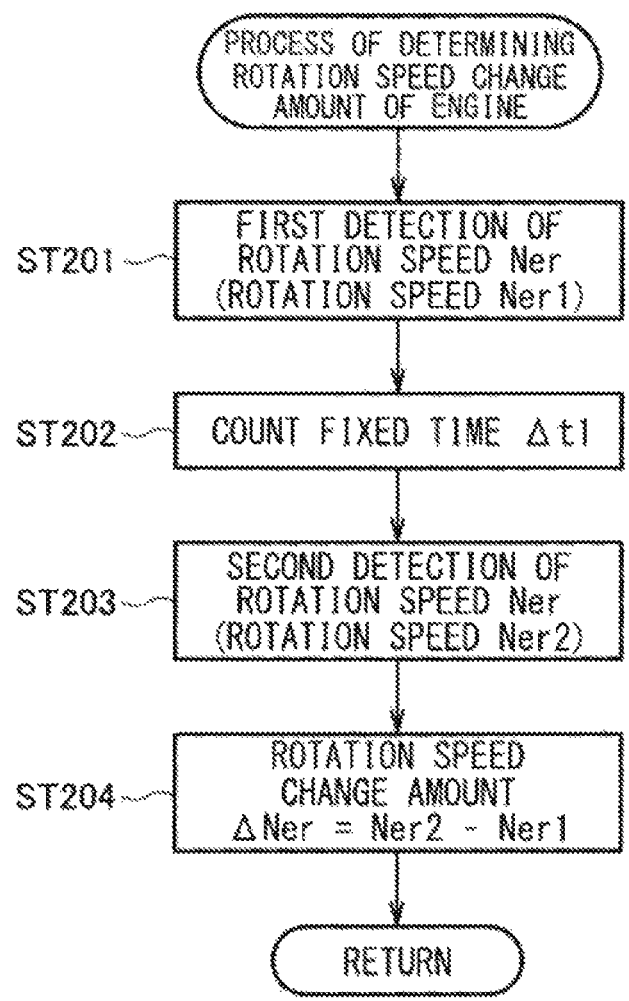
FIG. 13 shows an interruption routine of a change amount determination process of the rotation speed of an engine used in step ST102 of FIG. 12.

FIG. 13 is a control flow diagram showing an interruption routine of an engine rotation speed change amount determination process for determining the rotation speed change amount ΔNer of the engine 15.

When the interruption routine is started, firstly, in step ST201, the actual rotation speed Ner of the engine 15 is detected by the engine speed detection unit 123 (first detection). The net rotation speed Ner at this time will be referred to as the "first rotation speed Ner1". In the next step ST202, a predetermined fixed time period Δt1 is counted. In the next step ST203, the net rotation speed Ner of the engine 15 is detected again by the engine speed detection unit 123 (second detection). The net rotation speed Ner at this time will be referred to as the "second rotation speed Ner2".

In the next step ST204, the difference ΔNer between the first rotation speed Ner1 and the second rotation speed Ner2, i.e., the rotation speed change amount ΔNer (ΔNer=Ner2−Ner1) is determined, and then, the interruption routine is finished. It can be said that this rotation speed change amount ΔNer is a change amount ΔNer per predetermined time Δt1 (fixed time Δt1), of the net rotation speed Ner of the engine 15.

Figure 14:
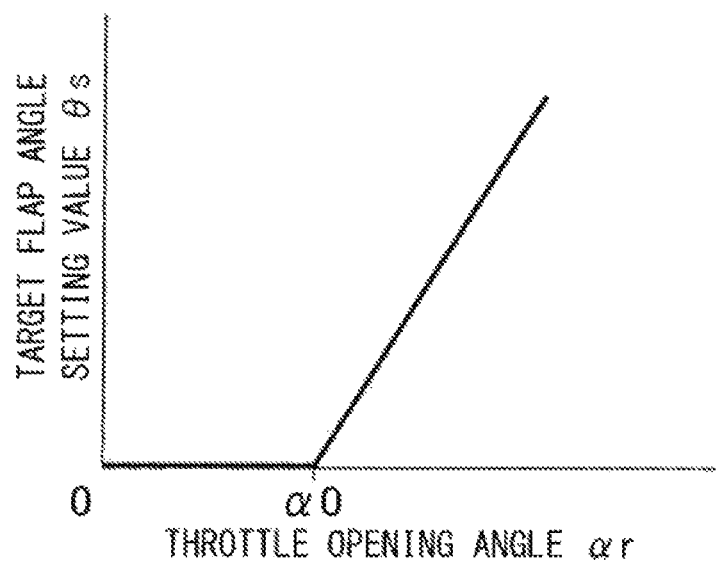
FIG. 14 is a map showing the net opening angle of a throttle valve and the target flap angle setting value used in step ST133 of FIG. 12.

FIG. 14 is a map used in step ST133 of FIG. 12. The horizontal axis denotes the throttle opening angle αr, and the vertical axis denotes the target flap angle setting value θs. The map is used for determining the target flap angle setting value θs corresponding to the net opening angle αr of the throttle valve 125. According to the characteristics of this map, the target flap angle setting value θs is "0" in a range where the net opening angle αr is between "0" and predetermined reference opening angle α0. As the net opening angle αr gets larger than the reference opening angle α0, the target flat angle setting value θs is increased proportionally (or substantially proportionally).

Figure 15:
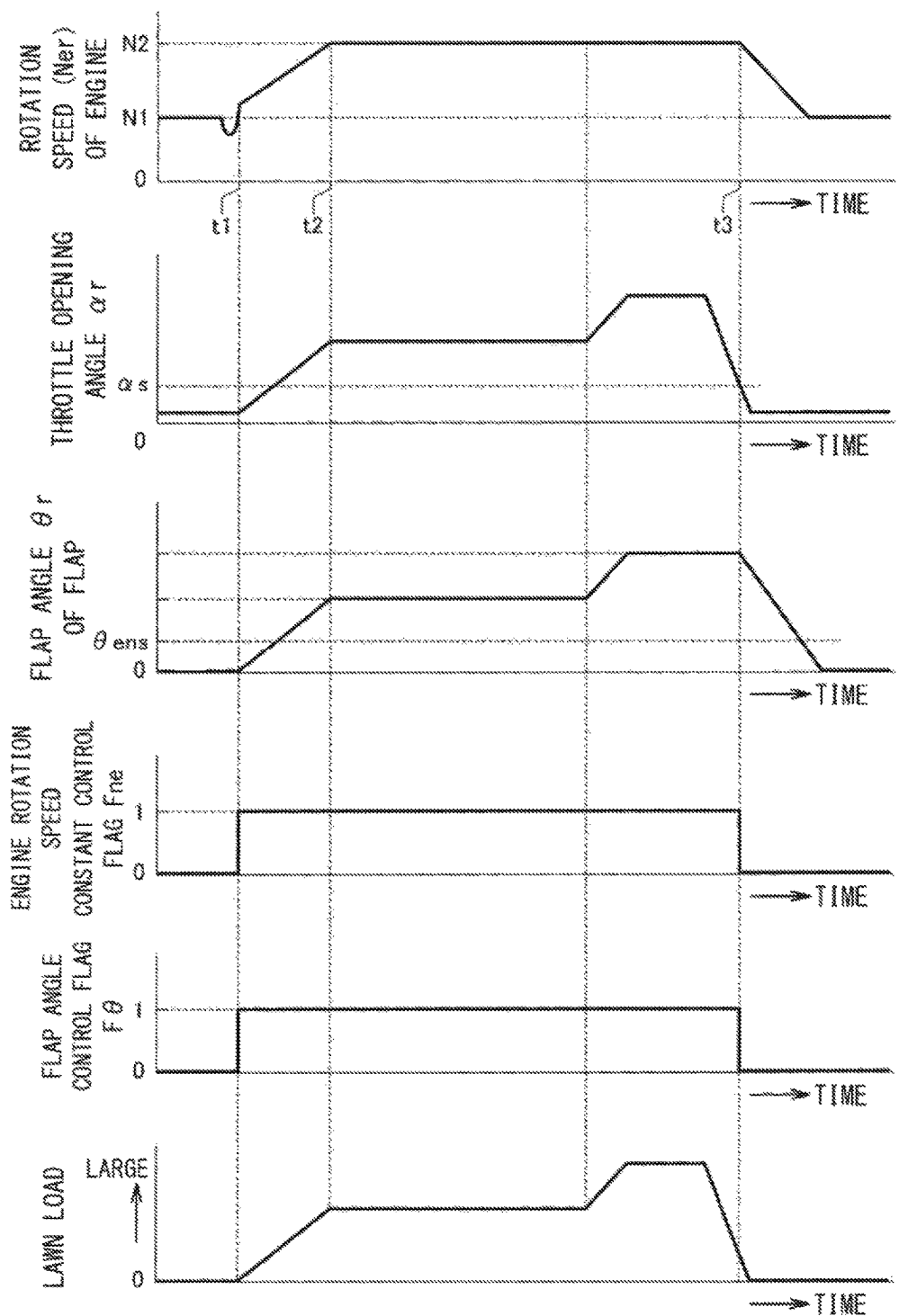
FIG. 15 is an operation diagram of the lawn mower when the control flow shown in FIG. 12 is performed.

Next, operation of each component at the time of performing the control flow shown in FIG. 12 will be described with reference to FIG. 15. FIG. 15 is a time chart of the lawn mower 10, showing operation of each component. In the time chart, the horizontal axis denotes time.

According to the flow chart, at time t1, the control unit 117 determines that the rotation speed change amount ΔNer of the engine 15 has exceeded a predetermined reference speed change amount ΔNs, i.e., ΔNer>ΔNs (step ST102). Further, the control unit 117 switches the net rotation speed Ner of the engine 15 from the first reference rotation speed N1 to the second reference rotation speed N2, and increases the net flap angle θr of the flaps 52, i.e., performs operation in the first control mode.

Further, over the period from time t2 to time t3, the control unit 117 controls the opening angle αr of the throttle valve 125 and the flap angle θr of the flaps 52 automatically, in a manner to keep the net rotation speed Ner of the engine 15 at the second reference rotation speed N2, regardless of the magnitude of the load (lawn load) of the cutter blade 14 (step ST122).

Thereafter, when the lawn load of the lawn in the portion cut by the cutter blade 14 is decreased significantly (e.g., when the lawn condition changes from the heavy lawn to the light lawn), the load on the engine 15 driving the cutter blade 14 is decreased. Consequently, the net opening angle αr of the throttle valve 125 is decreased. At time t3, the control unit 117 determines that the net opening angle αr of the throttle valve 125 is decreased below the predetermined reference opening angle αs, i.e., αr<αs (step ST108). Then, the net rotation speed Ner of the engine 15 is decreased for switching to the first reference rotation speed N1, and the net flap angle θr of the flaps 52 is decreased (e.g., the flaps 52 are placed in the horizontal state). That is, operation in the second control mode is performed.

As described above, when the electronic governor 126 implements control to keep the rotation speed Ner of the engine 15 constant over the period from time t2 to time t3 (this control not limited to the first and second reference rotation speeds N1, N2), as the load on the engine 15 gets larger, the electronic governor 126 is configured to implement control to increase the opening angle αr of the throttle valve 125, and controls the actuator 60 to increase the flap angle θr of the flaps 52. That is, the electronic governor 126 automatically controls the opening angle αr of the throttle valve 125 and the flap angle θr of the flaps 52 regardless of the magnitude of the load (lawn load) of the cutter blade 14.

When the lawn load on the cutter blade 14 becomes large, the load on the engine 15 becomes large. In this regard, as the load on the engine 15 gets larger, control is implemented to increase the opening angle αr of the throttle valve 125, and increase the flap angle θr of the flaps 52. In this manner the rotation speed Ner of the engine 15 is kept constant. When the flap angle θr becomes large, it is possible to increase the upward air flow by the flaps 52. Therefore, it is possible to perform the lawn mowing operation suitable for the large lawn load, highly efficiently.

The above explanation is summarized below. The reference rotation speed of the engine 15 is set to the predetermined first reference rotation speed N1 and the second reference rotation speed N2 which is higher than the first reference rotation speed N1 by a predetermined speed. The control unit 117 is configured to control the net rotation speed Ner of the engine 15 and the net flap angle θr of the flaps 52 by switching the operation between the first control mode and the second control mode.

In the "first control mode", during rotation of the engine 15 at the first reference rotation speed N1 (Nes=N1), in the case where the change amount ΔNer per predetermined time Δt1, of the net rotation speed Ner of the engine 15 detected by the engine speed detection unit 123 has exceeded the predetermined reference speed change amount ΔNs (ΔNer>ΔNs), control is implemented in a manner that the net rotation speed Ner of the engine 15 is maintained at the second reference rotation speed N2 which is higher than the first reference rotation speed N1, and the actuator 60 is controlled to increase the flap angle θr of the flaps 52.

In the "second control mode", during rotation of the engine 15 at the second reference rotation speed N2 (Nes=N2), if the net opening angle αr of the throttle valve 125 detected by the throttle opening angle detection unit 122 has fallen below the predetermined reference opening angle αs (αr<αs), control is implemented in a manner that the net rotation speed Ner of the engine 15 is decreased, and maintained at the first reference rotation speed N1, and the actuator 60 is controlled to decrease the net flap angle θr of the flaps 52 (e.g., place the flaps 52 in the horizontal state).

The characteristics of lawn grass (lawn condition) cut by the lawn mower 10 often changes depending on the regional climate. For example, lawn grass containing a large amount of water content is heavy, and lawn grass containing a small amount of water content is light. That is, there are different conditions of lawn grass. Further, even in the case of lawn grass growing on the same area, the lawn grass may have different lawn conditions.

The load on the cutter blade 14 is different depending on the lawn condition. During the lawn mowing operation by the cutter blade 14, the load on the engine 15 may be increased due to the rapid change of the lawn condition. Consequently, the net rotation speed Ner of the engine 15 is decreased. The opening angle αr of the throttle valve 125 for the engine 15 is subject to change as well. For example, during the lawn mowing operation by the cutter blade 14, the load on the engine 15 may be increased due to the rapid change of the lawn condition. In order to maintain the desired finishing quality of the lawn mowing operation, it is preferable to eliminate unevenness in the lawn grass due to the difference in the lawn condition. To this end, the human operator is required to detect the change in the lawn condition consciously, and this is laborious.

In this regard, when the change amount ΔNer per time Δt1 of the net rotation speed Ner of the engine 15 has exceeded the reference speed change amount ΔNs, the control unit 117 determines that a rapid change has occurred in the lawn condition, and implements the first control mode to increase the net rotation speed Ner of the engine 15. Then, the control unit 117 implements control to keep the rotation speed at the second reference rotation speed N2, and controls the actuator 60 to increase the flap angle θr of the flaps 52. As a result, the rotation speeds of the cutter blade 14 and the flaps 52 are increased, and the amount of the transportation wind can be increased. Also, it is possible to increase the upward air flow by the flaps 52. Therefore, it is possible to perform the lawn mowing operation suitable for the large lawn load, highly efficiently.

Meanwhile, when the load of the lawn condition (lawn load) in the portion cut by the cutter blade 14 is decreased significantly (e.g., when the lawn condition changes from the heavy lawn to the light lawn), the load of the engine 15 driving the cutter blade 14 is decreased. Consequently, the net opening angle αr of the throttle valve 125 is decreased. The control unit 117 determines that the net opening angle αr of the throttle valve 125 falls below the predetermined reference opening angle αs. Then, the control unit 117 performs operation in the second control mode. The net rotation speed Ner of the engine 15 is decreased for switching to the first reference rotation speed N1, and the net flap angle θr of the flaps 52 is decreased (e.g., the flaps 52 are placed in the horizontal state). Therefore, if the lawn load is decreased significantly, it is possible to switch the operation to return to the original first control mode. Thus, when the lawn load is small, by decreasing the net rotation speed Ner of the engine 15, it is possible to improve the fuel economy of the engine 15. Further, by decreasing the net flap angle θr of the flaps 52, it is possible to reduce the noises (e.g., wind noises) generated by rotation of the cutter blade 14.

Thus, regardless of the lawn condition, by orienting the lawn grass growing on the lawn ground to stand upright by the upward air flow, it is possible to cut (clip) the lawn grass by the cutter blade 14 efficiently. Further, after the lawn grass (grass clippings) cut by the cutter blade 14 is lifted upward, and swirled in the housing 11 by the upward air flow and the swirl air flow generated by the flaps 52, the lawn grass can be transported into the grass clippings container 22 efficiently. Therefore, the operator can perform the lawn mowing operation stably and highly efficiently regardless of the lawn condition. It is possible to eliminate unevenness in lawn grass after the lawn mowing operation due to the difference in the lawn condition, without requiring the operator to perform some operation consciously. Consequently, it is possible to improve the work efficiency of the lawn mowing operation.

Preferably, in this "second control mode", during rotation of the engine 15 at the second reference rotation speed N2, if it is determined that the net opening angle αr of the throttle valve 125 has fallen below the reference opening angle αs (αr<αs), after it is determined that the change amount ΔNer per predetermined time Δt1, of the net rotation speed Ner of the engine 15 has not exceeded the reference speed change amount ΔNs (ΔNer≤ΔNs), control is implemented to maintain the net rotation speed Ner of the engine 15 at the first reference rotation speed N1, and the actuator 60 is controlled to place the flaps 52 in the horizontal state (αr=0) (see steps ST107 to ST111).

Therefore, after the net rotation speed Ner of the engine 15 is stabilized substantially, it is possible to adjust this net rotation speed Ner, and place the flaps 52 in the horizontal state. Even in the case where the lawn load is decreased, and then, increased immediately, it is possible to handle the changes of the lawn load promptly. Therefore, it is possible to perform lawn mowing operation more stably and highly efficiently, regardless of the lawn condition.

Figure 16:
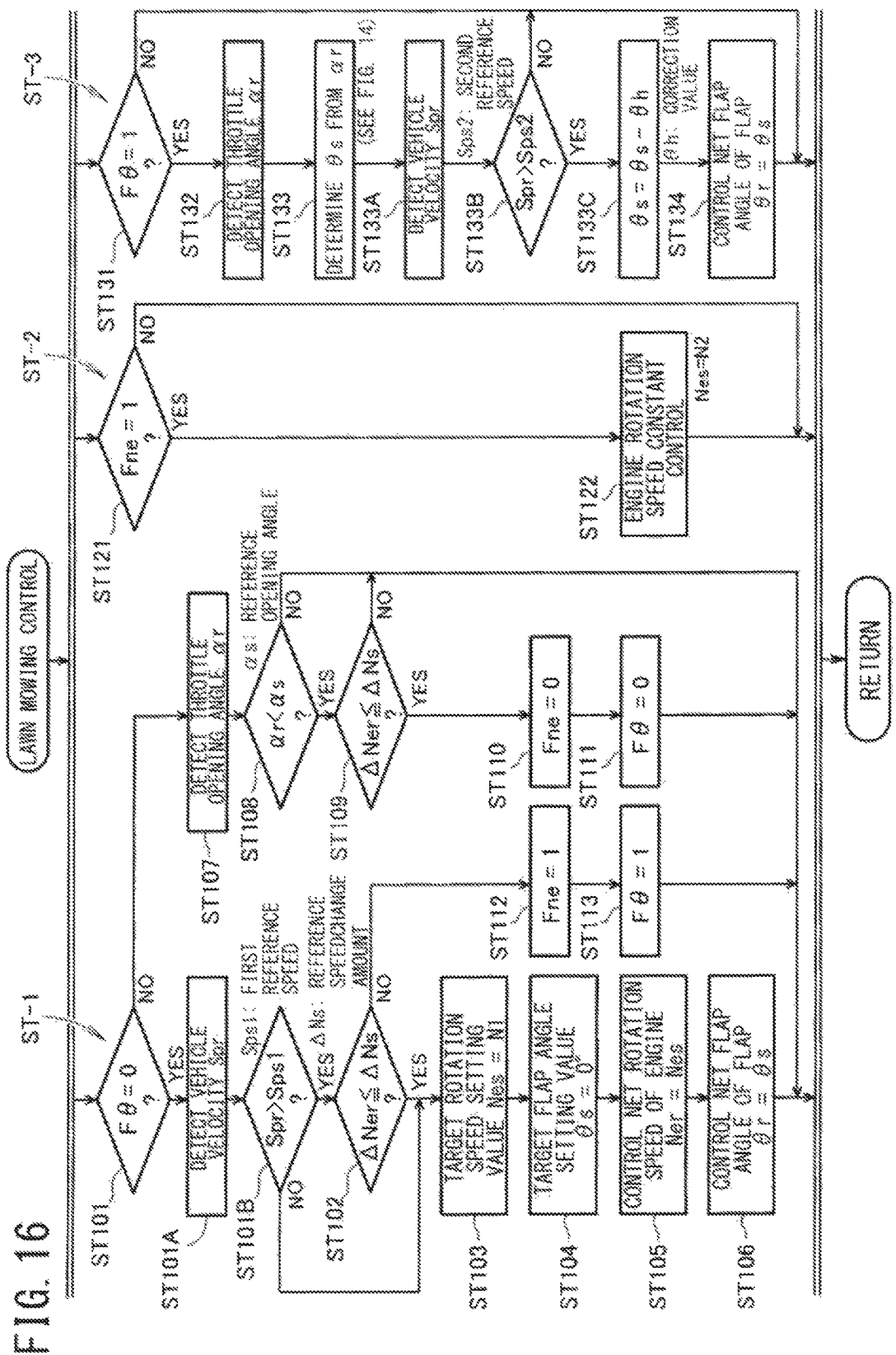
FIG. 16 shows a sub-routine of a modified example of step ST22 of the control flow chart shown in FIG. 10.

Next, a modified example of the sub-routine shown in FIG. 12 will be described with reference to FIG. 16. The sub-routine of the modified example shown in FIG. 16 is different from the sub-routine shown in FIG. 12 only in the following points, and is the same as the sub-routine shown in FIG. 12 in the other respects. The description of the sub-routine of the modified example which is not related to the differences is omitted.

The first difference is that the sub-routine of the modified example shown in FIG. 16 additionally includes new steps ST101A and ST101B, between step ST101 and step ST102, in the first control step ST-1.

The second difference is that the sub-routine of the modified example shown in FIG. 16 additionally includes new steps ST133A to ST133C, between step ST133 and step ST134, in the third control step ST-3.

Specifically, when the control proceeds from step ST101 to step ST01A, the travel speed detection unit 112 detects the actual travel speed Spr (net travel speed Spr) of the lawn mower 10, i.e., the vehicle velocity Spr. In the next step ST101B, it is determined whether or not the vehicle velocity Spr is higher than a predetermined first reference speed Sps1 (Spr>Sps1). If it is determined that the vehicle velocity Spr is higher than the first reference speed Sps1 (Spr>Sps1), the control proceeds to step ST102, and if it is determined that the vehicle velocity Spr is not higher than the first reference speed Sps1 (Spr≤Sps1), the control proceeds to step ST103.

When the control proceeds from step ST133 to step ST133A, the travel speed detection unit 112 detects the actual travel speed Spr (net travel speed Spr) of the lawn mower 10, i.e., the vehicle velocity Spr.

In the next step ST133B, it is determined whether or not the vehicle velocity Spr is higher than a predetermined second reference speed Sps2 (Spr>Sps2). The second reference speed Sps2 is set to be higher than the first reference speed Sps1. In step ST133B, if it is determined that the vehicle velocity Spr is higher than the second reference speed Sps2 (Spr>Sps2), the control proceeds to step ST133C, and if it is determined that the vehicle velocity Spr is not higher than the second reference speed Sps2 (Spr≤Sps2), the control returns to step ST22.

In step ST133C, the target flap angle setting value θs determined in the above step ST133 is decreased by a predetermined correction value θh (θs=θs−θh), and then, the control proceeds to step ST134. That is, since the vehicle velocity Spr is high, the load on the cutter blade 14 and the flaps 52 is decreased. In step ST134, the actuator 60 is controlled until the net flap angle θr of the flaps 52 becomes equal to the target flap angle setting value θs (θr=θs), and then, the control returns to step ST22.

Figure 17:
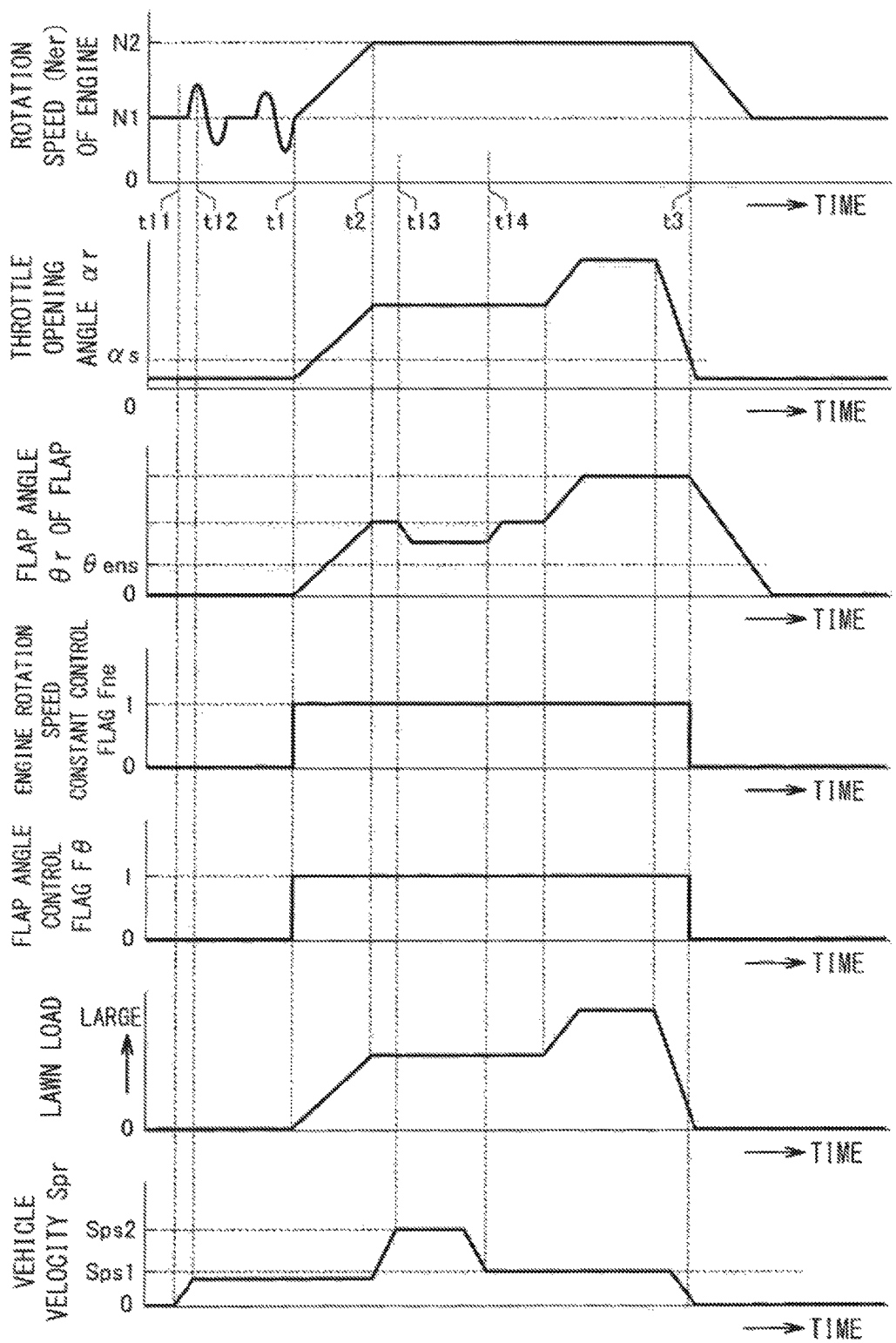
FIG. 17 is an operation diagram of a lawn mower when the control flow shown in FIG. 16 is performed.

Next, operation of each component at the time of performing the control flow shown in FIG. 16 will be described with reference to FIG. 17. FIG. 17 is a time chart of the lawn mower 10, showing operation of each component. In the time chart, the horizontal axis denotes time.

Now, the net rotation speed Ner of the engine 15 is maintained at the predetermined first reference rotation speed N1. After then, at time t11, the operator starts traveling of the lawn mower 10. After then, at time t12, the rotation speed change amount ΔNer of the engine 15 temporarily exceeds the predetermined reference speed change amount ΔNs (ΔNer>ΔNs). Meanwhile, at this time t12, the net travel speed Spr of the lawn mower 10 is lower than the predetermined reference speed Sps1 for starting its travel movement. The control unit 117 determines that Spr≤Sps1 (step ST101B), and implements control in a manner that the net rotation speed Ner of the engine 15 is maintained at the first reference rotation speed N1 (steps ST103B and ST105). That is, the control unit 117 cancels the phenomenon "ΔNer>ΔNs" which has occurred temporarily as a result of starting the travel of the lawn mower 10.

The operator makes the net travel speed Spr of the lawn mower 10 higher than the predetermined second reference speed Sps2 over a time period from time t13 to time t14, after elapse of time t2. The control unit 117 determines that Spr>Sps2 (step ST133B), and decreases the net flap angle θr of the flaps 52 by a predetermined correction value θh over the time period from time t13 to time t14 (step ST133C to ST134).

Explanation of the above modified embodiment is summarized as follows. If the control unit 117 determines that the net travel speed Spr (vehicle velocity Spr) of the lawn mower 10 detected by the travel speed detection unit 112 has exceeded the predetermined reference speed Sps2 (step ST133B), the control unit 117 is configured to control the actuator 60 to decrease the net flap angle θr of the flaps 52 (steps ST133C to ST134).

In the case the net travel speed Spr of the lawn mower 10 is increased, the load on the cutter blade 14 and the flaps 52 is increased. If the net travel speed Spr of the lawn mower 10 exceeds the reference speed Sps2, the net flap angle θr of the flaps 52 is decreased. It is possible to prevent engine stall while maintaining the desired finishing quality of the lawn mowing operation.

Preferably, if it is determined one of a first condition and a second condition is satisfied, the control unit 117 is configured to maintain the net rotation speed Ner of the engine 15 at the first reference rotation speed N1.

The first condition is a condition where the net travel speed Spr of the lawn mower 10 detected by the travel speed detection unit 112 is below a predetermined reference speed Sps1 (first reference speed Sps1) at the time of starting travel movement of the lawn mower 10 (see step ST101B).

The second condition is a condition where the net travel speed Spr of the lawn mower 10 exceeds the reference speed Sps1 (first reference speed Sps1) at the time of starting travel movement of the lawn mower 10, and the change amount ΔNer per fixed time Δt1, of the net rotation speed Ner of the engine 15 does not exceed the predetermined reference speed change amount ΔNs at the time of starting travel movement of the lawn mower 10 (see steps ST101B to ST102).

In this manner, it is possible to cancel the temporal unstable phenomenon in the net rotation speed Ner of the engine 15 when the lawn mower 10 starts traveling (unstable phenomenon at the time of starting travel movement).

Accordingly, it is possible to avoid erroneously recognizing the unstable phenomenon in the net rotation speed Ner of the engine 15 due to temporal increase in the lawn load (unstable phenomenon which occurs when the lawn load is increased) and the unstable phenomenon at the time of starting travel movement of the lawn mower. Accordingly, it is possible to improve the work efficiency of the lawn mowing operation much more.

Although the present invention has been described in connection with the structure where the left and right rear wheels 13 are driven by the drive source 15, the present invention may adopt structure where the left and right rear wheels 13 are driven by a separate electric motor (not shown).

The lawn mower 10 of the present invention is suitably adopted as a walk-behind lawn mower.

While the invention has been particularly shown and described with reference to a preferred embodiment, it will be understood that variations and modifications can be effected thereto by those skilled in the art without departing from the scope of the invention as defined by the appended claims.

What is claimed is:

1. A lawn mower comprising:
   a cutter blade rotatable about a rotation shaft extending in a vertical direction;
   a drive source configured to drive the cutter blade through the rotation shaft;
   a flap provided for the cutter blade, the flap having a flap angle changeable along a horizontal line which is perpendicular to the rotation shaft;
   an actuator configured to control the flap angle of the flap;
   a control unit configured to control the actuator; and
   a blade switching unit configured to switch the cutter blade between an operation state and a stop state,
   wherein the control unit is configured to control the actuator in a manner that the flap angle of the flap is increased in a case in which the control unit determines that a stop switch signal has been received from the blade switching unit.

2. The lawn mower according to claim 1, further comprising a stop detection unit configured to detect that at least one of the drive source and the cutter blade in a rotation state has been stopped, and output a stop signal,
   wherein the control unit is configured to control the actuator to place the flap angle of the flap in a substantially horizontal state in a case in which the control unit determines that the stop signal has been received from the stop detection unit.

3. The lawn mower according to claim 2, further comprising a drive source operation switch configured to switch between start and stop of operation of the drive source; and
   a flap angle detection unit configured to detect the flap angle of the flap,
   wherein the control unit is configured to control the actuator to place the flap in a horizontal state upon reception of a start operation signal from the drive source operation switch, and thereafter, start operation of the drive source after receiving a signal indicating that the flap is at an angle of the horizontal state, from the flap angle detection unit.

4. The lawn mower according to claim 2, further comprising a clutch provided in a working power transmission system from the drive source to the rotation shaft; and
   a flap angle detection unit configured to detect the flap angle of the flap,
   wherein the blade switching unit is configured to switch the clutch to switch the cutter blade between the operation state and the stop state, and configured to output an operation switch signal when the cutter blade has been switched to the operation state; and
   the control unit is configured to control the actuator to place the flap in the substantially horizontal state upon reception of the operation switch signal from the blade switching unit, and thereafter, start rotation of the cutter blade after receiving a signal indicating that the flap is at an angle of the horizontal state, from the flap angle detection unit.

* * * * *